US009577977B2

(12) United States Patent
Rosen et al.

(10) Patent No.: US 9,577,977 B2
(45) Date of Patent: *Feb. 21, 2017

(54) MESSAGING SYSTEM AND METHOD

(71) Applicant: TRIPLAY, INC., NY, NY (US)

(72) Inventors: Gil Rosen, Tel Mond (IL); Yaacov Ziv, Ramat Yishai (IL)

(73) Assignee: TRIPLAY, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/483,625

(22) Filed: Sep. 11, 2014

(65) Prior Publication Data
US 2014/0378102 A1    Dec. 25, 2014

Related U.S. Application Data

(63) Continuation of application No. 13/679,378, filed on Nov. 16, 2012, now Pat. No. 8,874,677, which is a (Continued)

(51) Int. Cl.
*G06F 15/16* (2006.01)
*H04L 12/58* (2006.01)
(Continued)

(52) U.S. Cl.
CPC ............. *H04L 51/36* (2013.01); *G06F 21/604* (2013.01); *H04L 12/5825* (2013.01);
(Continued)

(58) Field of Classification Search
CPC ......... H04L 65/40; H04L 51/36; H04L 12/581
(Continued)

(56) References Cited

U.S. PATENT DOCUMENTS 6,034,970 A    3/2000 Levac et al.
6,145,084 A    11/2000 Zuili et al.
(Continued)

FOREIGN PATENT DOCUMENTS

WO    01/03011 A2    1/2001
WO    02/44828 A2    6/2002

OTHER PUBLICATIONS

WhatsApp Inc. v. TripPlay Communications Ltd., Petition for Inter Partes Review of U.S. Pat. No. 8,332,475, Inter Partes Review No. 2015-00740, filed Feb. 14, 2015, including all exhibits.
(Continued)

*Primary Examiner* — Adnan Mirza
(74) *Attorney, Agent, or Firm* — Browdy and Neimark, P.L.L.C.

(57) ABSTRACT

A method of cross-platform messaging including receiving, by a messaging system, at least one initial message having a message format, an initial message layout and data indicative of at least one user associated with the at least one initial message, and before delivery to a destination communication device associated with the at least one user, converting, by the messaging system, an initial message into an adapted message, and facilitating, by the messaging system, delivery of the adapted message to the destination communication device. The adapted message is characterized by, at least, an adapted message layout, and the adapted message layout differs from the initial message layout in a characteristic associated with respective message layout such as number of media objects, a graphical image of a media object, a size of a placeholder related to a media object, and a location of a media object within a respective message layout.

20 Claims, 12 Drawing Sheets

Related U.S. Application Data continuation of application No. 12/064,489, filed as application No. PCT/IL2006/000976 on Aug. 22, 2006, now Pat. No. 8,332,475.

(60) Provisional application No. 60/749,626, filed on Dec. 13, 2005, provisional application No. 60/749,625, filed on Dec. 13, 2005, provisional application No. 60/709,830, filed on Aug. 22, 2005.

(51) Int. Cl.

| | |
|---|---|
| H04M 1/725 | (2006.01) |
| H04W 4/12 | (2009.01) |
| H04W 4/18 | (2009.01) |
| H04W 8/18 | (2009.01) |
| H04W 60/00 | (2009.01) |
| H04L 29/08 | (2006.01) |
| G06F 21/60 | (2013.01) |
| H04L 29/06 | (2006.01) |

(52) U.S. Cl.
CPC ............ *H04L 51/06* (2013.01); *H04L 51/063* (2013.01); *H04L 51/066* (2013.01); *H04L 51/10* (2013.01); *H04L 51/16* (2013.01); *H04L 51/34* (2013.01); *H04L 63/105* (2013.01); *H04L 65/601* (2013.01); *H04L 65/608* (2013.01); *H04L 67/10* (2013.01); *H04L 67/2823* (2013.01); *H04L 67/42* (2013.01); *H04M 1/72547* (2013.01); *H04M 1/72563* (2013.01); *H04W 4/12* (2013.01); *H04W 4/18* (2013.01); *H04W 8/18* (2013.01); *H04W 60/00* (2013.01); *H04L 12/581* (2013.01); *H04L 12/5895* (2013.01); *H04L 51/04* (2013.01); *H04L 65/40* (2013.01); *H04L 65/4023* (2013.01)

(58) Field of Classification Search
USPC .................................................. 709/204, 206
See application file for complete search history.

(56) References Cited

U.S. PATENT DOCUMENTS

| | | | |
|---|---|---|---|
| 6,151,675 | A | 11/2000 | Smith |
| 6,167,441 | A | 12/2000 | Himmel et al. |
| 6,192,407 | B1 | 2/2001 | Smith et al. |
| 6,728,757 | B1 | 4/2004 | Friend |
| 6,782,412 | B2 | 8/2004 | Brophy et al. |
| 6,912,564 | B1 | 6/2005 | Appelman et al. |
| 6,928,617 | B2 | 8/2005 | Druyan et al. |
| 7,171,190 | B2 | 1/2007 | Ye et al. |
| 7,233,802 | B2 | 6/2007 | Comer et al. |
| 7,464,337 | B2 | 12/2008 | Han et al. |
| 7,574,203 | B2 | 8/2009 | Laumen et al. |
| 7,593,991 | B2 | 9/2009 | Friedman et al. |
| 7,630,705 | B2 | 12/2009 | Galicia et al. |
| 7,685,315 | B2 | 3/2010 | Pessi et al. |
| 7,817,987 | B2 | 10/2010 | Mian et al. |
| 7,876,766 | B1 | 1/2011 | Atkins et al. |
| 8,181,104 | B1 | 5/2012 | Helfand et al. |
| 8,332,475 | B2 | 12/2012 | Rosen et al. |
| 8,526,466 | B2 | 9/2013 | Tischer et al. |
| 2001/0054073 | A1 | 12/2001 | Ruppert et al. |
| 2003/0084405 | A1 | 5/2003 | Ito et al. |
| 2003/0158902 | A1 | 8/2003 | Volach |
| 2003/0191816 | A1 | 10/2003 | Landress et al. |
| 2003/0208547 | A1 | 11/2003 | Branimir |
| 2003/0236892 | A1 | 12/2003 | Coulombe |
| 2004/0015547 | A1 | 1/2004 | Griffin et al. |
| 2004/0153517 | A1 | 8/2004 | Gang et al. |
| 2004/0177117 | A1 | 9/2004 | Huang |
| 2004/0177119 | A1 | 9/2004 | Mason et al. |
| 2004/0181550 | A1 | 9/2004 | Warsta et al. |
| 2004/0267884 | A1 | 12/2004 | Sar-Shalom |
| 2005/0015443 | A1 | 1/2005 | Levin et al. |
| 2005/0033852 | A1 | 2/2005 | Tenhunen |
| 2005/0044144 | A1 | 2/2005 | Malik et al. |
| 2005/0060381 | A1 | 3/2005 | Huynh et al. |
| 2005/0120309 | A1 | 6/2005 | Jang |
| 2005/0136953 | A1 | 6/2005 | Jo et al. |
| 2005/0143136 | A1 | 6/2005 | Lev et al. |
| 2005/0144236 | A1 | 6/2005 | Ying et al. |
| 2005/0144247 | A1 | 6/2005 | Christensen et al. |
| 2005/0159135 | A1 | 7/2005 | Kim |
| 2005/0235038 | A1 | 10/2005 | Donatella et al. |
| 2005/0243978 | A1 | 11/2005 | Son et al. |
| 2006/0053227 | A1 | 3/2006 | Ye et al. |
| 2006/0069790 | A1 | 3/2006 | Surana |
| 2006/0085417 | A1 | 4/2006 | John et al. |
| 2006/0128387 | A1 | 6/2006 | Kim |
| 2006/0146997 | A1 | 7/2006 | Qian et al. |
| 2006/0161626 | A1 | 7/2006 | Cardina et al. |
| 2006/0176902 | A1 | 8/2006 | Bellordre et al. |
| 2007/0011256 | A1 | 1/2007 | Klein |
| 2007/0076857 | A1 | 4/2007 | Chava et al. |
| 2007/0239895 | A1 | 10/2007 | Alperin et al. |

OTHER PUBLICATIONS

Meech et al., "A Multi-Agent System for Personal Messaging" NRC-CNRC, NRC Publications Archive, Jun. (2000), http://nparc.cisti-icist. nrc-cnrc.gc.ca/npsi/ctrl?action=rtdoc&an=8914113 &lang=en: http://nparc.cisti-icist.nrc-cnrc.gc.ca/npsi/ctrl?action=rtdoc&an=8914113&lang=fr.

Tittel et al., "HTML for Dummies, 2nd Edition" IDG Books Worldwide (1997), pp. 1, 4, 17, 57-84.

Coulombe et al., "Multimedia Adaptation for the Multimedia Messaging Service" IEEE Communications Magazine, Jul. 2004, pp. 120-126 (2004).

Vimatix Bulk Messaging System (Copyright 2005) web site http://www.vimatix.com/bms/html.

*WhatsApp Inc.* v. *TripPlay Communications Ltd.*, Petition for Inter Partes Review of U.S. Pat. No. 8,874,677 Inter Partes Review No. 2016-00717, filed Mar. 6, 2016, including all exhibits.

*WhatsApp Inc.* v. *TripPlay Communications Ltd.*, Petition for Inter Partes Review of U.S. Pat. No. 8,874,677 Inter Partes Review No. 2016-00718, filed Mar. 6, 2016, including all exhibits.

Meyer, "Cascading Style Sheets: The Definitive Guide, Second Edition," O'Reilly Media, Inc., Sebastopol, CA, pp. 1-22, 88-89, 91, 361-384 (2004).

Library of Congress Online Catalog—Item Information for Meyer, Cascading Style Sheets: The Definitive Guide (2nd Ed. 2004) ("Meyer Loc Record"), retrieved Feb. 24, 2016.

Tittel, "More Internet for Dummies, Second Edition," IDG Books Worldwide, Inc., Foster City, CA, pp. 262, 362 (1997).

"Random House Concise Dictionary of Science & Computers," Random House Reference, NY, NY, pp. 646-647 (2004).

Newton, "Newton's Telecom Dictionary (22nd edition)" CMP Books, San Francisco, CA, p. 911 (2006).

Le Bodic, :"Multimedia Messaging Service: an Engineering Approach to MMS," John Wiley & Sons, Ltd, West Sussex, England, p. 106 (2003).

"A Dictionary of Computing (5th Edition)," Oxford University Press, Oxford, England, pp. 306-307, 524-545 (2004).

"IEEE 100: The Authoritative Dictionary of IEEE Standards Terms (7th Edition)," Standards Information Network, IEEE Press, New York, NY p. 640 (2000).

*WhatsApp Inc.* v. *TripPlay Communications Ltd.*, Petition for Inter Partes Review of U.S. Pat. No. 9,049,574 (Claims 1-6 and 9-11) Inter Partes Review No. 2016-01659, filed Aug. 21, 2016, including all exhibits.

*WhatsApp Inc.* v. *TripPlay Communications Ltd.*, Petition for Inter Partes Review of U.S. Pat. No. 9,049,574.

*WhatsApp Inc.* v. *TripPlay Communications Ltd.*, Petition for Inter Partes Review of U.S. Pat. No. 9,055,416 (Claims 1-12) Inter Partes Review No. 2016-01661, filed Aug. 21, 2016, including all exhibits.

(56) References Cited

OTHER PUBLICATIONS

*WhatsApp Inc. v. TripPlay Communications Ltd.*, Petition for Inter Partes Review of U.S. Pat. No. 9,055,416 (Claims 13-15) Inter Partes Review No. 2016-01662, filed Aug. 21, 2016, including all exhibits.
Webster's II New College Dictionary, Houghton Mifflin, USA; Third edition, p. 638 (2005).
Pfaffenberger, B., Webster's New World Computer Dictionary, 10 edition, Wiley Publishing, Inc., Indianapolis, Indiana, pp. 212-213, (2003).
The American Heritage Dictionary of the English Language, Fourth Edition, Houghton Mifflin Company, USA, p. 1203, (2000).
Random House, Webster's Unabridged Dictionary, Second Edition, Random House, Inc., New York, NY, USA, p. 1326 (2001).
Collins English Dictionary, Seventh Edition, HarperCollins Publishers, Glasgow, Scotland, p. 1116 (2005).
*WhatsApp Inc. v. TriPlay, Inc.*, IPR2015-00740, Final Written Decision, Paper No. 61 (P.T.A.B. Aug. 17, 2016).
"Hyperlink," Computer Desktop Encyclopedia, The Computer Language Company Inc., Point Pleasant, PA, USA, Version 18.3 (3rd Quarter 2005).
Microsoft Computer Dictionary, Fifth Edition, Microsoft Press, Redmond, WA, pp. 336 and 392 (2002).
Newton, H., Newton 's Telecom Dictionary, 21st Edition, CMP Books, San Francisco, CA, p. 848 (2005).
Murdock, K., Master Visually HTML 4 and XHTML 1, IDG Books Worldwide, Inc., Foster City, CA, pp. 178 and 179 (2000).
Keogh, D. and Wood, T., Village Phone Replication Manual, The United Nations Information and Communication Technologies Task Force, New York, NY, pp. 61 and 62 (2005).
*WhatsApp Inc. v. TripPlay Inc.*, Decision Institution of Inter Partes Review 37 C.F.R. § 42.108, Case IPR2016-00717, U.S. Pat. No. 8,874,677 B2, Entered Sep. 7, 2016.
*WhatsApp Inc. v. TripPlay Inc.*, Decision Institution of Inter Partes Review 37 C.F.R. § 42.108, Case IPR2016-00718, U.S. Pat. No. 8,874,677 B2, Entered Sep. 8, 2016.

MESSAGING SYSTEM AND METHOD

FIELD OF THE INVENTION

This invention relates to a field of electronic messaging and, in particular, to cross-platform messaging.

BACKGROUND OF THE INVENTION

The versatility of contemporary electronic messaging services is growing and giving rise to new message formats and new devices with messaging capabilities. Emerging message formats (e.g. MMS (Multimedia Message Service), SyncML, PoC (Push-to-Talk over Cellular), etc.) are complementing the traditional messaging services (e.g., e-mail, Short Message Service, instant messaging, etc.). Accordingly, many types of communication devices start to implement messaging capabilities whereas supporting different and not always compatible message and communication formats.

The problem of cross-platform messaging was recognized in the Prior Art and various systems were developed to provide a solution, for example:

U.S. Pat. No. 6,782,412 (Brophy et al.) entitled "Systems and methods for providing unified multimedia communication services" discloses a platform employing a client/server architecture to provide an extensible set of real time and messaging communication services to a plurality of users. The platform allows the clients to configure and activate the services as each user wishes, thereby providing individual control over the communication services. The platform includes a server that allows a user to select how to participate in a communications event. This can include control over the end points and media over which the communications event occurs. The systems described herein additionally provide a framework for developing integrated voice and data services that can be deployed on the platform for extending the services available to the plurality of clients.

U.S. Pat. No. 6,912,564 (Appelman et al.) entitled "System for instant messaging the sender and recipients of an e-mail message" discloses techniques for transferring electronic data between users of a communications system including a host system structured and arranged to receive and deliver messages of various types between users of the communications system. The host system includes an instant messaging network; a mail gateway; and a configuring network in communication with both the instant messaging network and the mail gateway. The instant messaging network enables instant messaging communication between users of the communications system and has the capability to monitor whether a certain user is capable of receiving an instant message at a particular moment. The mail gateway receives and delivers e-mail messages to users of the communications system. The configuring network is dedicated to automatically configuring instant messaging communication between an intended recipient of an e-mail message and the sender of the e-mail message.

US Patent Application No. 2003/158,902 (Volach) entitled "Multimedia instant communication system and method" discloses a rich content delivery system including a rich content unit to send multi-media communications generally instantly, a presence unit to communicate with the messaging unit, and a network access layer to communicate with the rich content unit. Also described is a rich content delivery system for wireless devices including a rich content unit to send multi-media communications to wireless devices, a presence unit to communicate with the rich content unit, and a network access layer to communicate with said rich content unit.

US Patent Application No. 2003/191,816 (Landress) entitled "System and method for creating and delivering customized multimedia communications" discloses a system and business methodology for providing interactive and customizable digital full-motion, animated and static multimedia content, to be used for communicating unique personalized entertainment, information, and messages and advertising to be delivered via the internet, electronic mail, or any other methods of delivering interpersonal communications and messages. The communications and messages are initiated and received by senders and recipients visiting a host site of the system through the internet. Content within the customized communication includes content personally relevant to a user which is integrally associated with sponsorship or advertising information. Creation of a customized communication begins by selection of a content item by a user, which content may be personalized by graphical editing techniques. Personalized or non-personalized content may be executed in parallel or in series with other content items in a multi-linear playback sequence compiled according to a predetermined script to produce a finished customized multimedia communication. The host site also provides other features and products desirable to users, such as screensavers, reminder services, etc.

US Patent Application No. 2004/177,117 (Huang) entitled "Method of sharing multimedia" discloses a multimedia sharing method for email message recipient, involving integrating multimedia file into template to construct email message that is transmitted to recipient, and opening file when message is received.

US Patent Application No. 2004/177,119 (Mason et al.) entitled "System and method for presence enabled e-mail delivery" discloses a telecommunications system including a network, a destination multimedia server, and a destination presence server coupled to the network. A plurality of multimedia clients is also coupled to the network. The multimedia clients include a presence option and are adapted to be able to select whether the option is to be activated. In operation, when a client sends an e-mail to another client, the destination multimedia server receives the e-mail and determines if the recipient supports presence. If so, the destination multimedia server sends a query to the destination presence server to check the recipient's presence. If the recipient is present, the message can be delivered. If not, the message can be held on the server until the recipient is present.

US Patent Application No. 2004/267,884 (Sar-Shalom) entitled "Automatic messaging client launcher for a communication device" discloses an automatic messaging client launcher for a communication device which automatically launches the communication device's messaging client, when the device is calling a currently unavailable destination communication device. The automatic messaging client launcher consists of an availability detector and a messaging initiator. The availability detector determines if the communication device being called is available. If the destination device is unavailable, the messaging initiator launches the messaging client.

US Patent Application No. 2005/15,443 (Levine et al.) entitled "Personal message delivery system" discloses a system comprising a plurality of interfaces configured to interface with plurality of subscribers communication devices using a plurality of formats. A group service module is provided configured to maintain communication among groups of the subscribers. A platform conversion module is also provided and is coupled to the plurality of interfaces and the group services modules configured to connect each of the plurality of the subscribers within a group, regardless of the communication protocols used by the subscribers.

US Patent Application No. 2005/33,852 (Tenhunen) entitled "System, apparatus, and method for providing presence boosted message service reports" discloses a system, apparatus, and method for automatically providing presence information using existing messaging services. Backward messaging such as read reports and delivery reports automatically include presence information from presence server according to user preferences contained within profile database. The presence information may be disseminated through any messaging service, such as the Multimedia Messaging Service (MMS) and is also supported by Session Initiated Protocol (SIP) signalling.

US Patent Application No. 2005/120,309 (Jang) entitled "Method of and apparatus for displaying messages on a mobile terminal" discloses a method and apparatus simultaneously displaying the main text and/or more attached filed of a message received in a mobile terminal. This simultaneous display allows a user to confirm the main text and attached files in the message. The main text and attached files may be shown in respective areas of the display.

US Patent application No. 2005/136,953 (Jo et al.) entitled "User interface for creating multimedia message of mobile communication terminal and method thereof" discloses a user interface for creating a multimedia message of a mobile communication terminal in which menu fields for creating a multimedia message are displayed in one screen, and when inputting content for each menu field is completed, it is automatically switched to a multimedia message-creating screen in which a selecting bar is positioned at the next field. In addition, while a user is using a multimedia function, a current image can be switched to the multimedia message-creating screen according to a user's need. Thus, the number of user's key manipulations can be reduced in creating the multimedia message, thereby enhancing a user's convenience.

US Patent Application No. 2005/144,236 (Ying) entitled "Identifying a device to a network" discloses a method comprising: a) receiving one of a Short Message Service, Enhanced Message Service, Multimedia Message Service, and SyncML message; b) extracting a device identifier from the message; and c) applying the device identifier to determine a device status. The device comprises information about the device's capabilities to receive, process, and display information and location information about the location of the mobile device. For example, device information may comprise information about the device's graphic display capabilities, communication bandwidth, and processor speed while the location information may be useful when delivering services to the device. Location information may be 'literal', e.g. a geographic address or location, or 'logical', e.g. "In a Meeting", "In Transit", and so on. The wireless network comprises subscriber information, device status, permissions and media delivery preferences. The media delivery preferences include information about the manner in which information should be communicated to the subscriber. Examples include frame rate, color schemes, visual quality, and visual layout.

US Patent Application No. 2005/144,247 (Christensen et al.), entitled "Method and system for voice on demand private message chat", discloses a system and method for establishing a private message chat between electronic devices. The method includes steps of providing an indication as to the availability of a user for receiving a private message chat; receiving an audio input message from at least one first client; and transmitting the audio input message to at least one second client over a communications network, wherein the at least one second client can receive, temporarily store and play back the audio input message. The first client may receive a reply audio input message from the at least one second client or, receive a reply text input message from the at least one second client, and subsequently may further communicate back to the second client device via one of audio or text messaging, according to that user's discretion. The transmitting of any audio input message may be accomplished via VoIP or SIP.

US Patent Application No. 2005/159,135 (Kim) entitled "System and method for making a multimedia message service compatible with non-supported terminals" discloses a system and method for making a multimedia message service compatible with a non-supported multimedia message terminal. The system comprises a first system for converting a format of a multimedia message and transmitting a uniform resource locator and an access code of the converted multimedia message in response to a receiving terminal being detected as the non-supported multimedia message terminal. The system further comprises a second system for receiving the converted multimedia message, and transmitting the uniform resource locator and the access code to the non-supported multimedia terminal. The non-supported multimedia terminal receives the converted multimedia message.

US Patent Application No. 2005/235,038 (Donatella et al.) entitled "Method of and apparatus for server-side management of buddy lists" discloses a method of contact lists management in a presence enabled application supported by a communication system and having a client side on a user equipment and a server side within a presence enabled network accessible by the users through said communication system, the application being of a type in which uses of the application form time-variable virtual communities of users that temporarily interact for the pm-poses of the application. The method includes: user's registration with the server-side of the application, to provide candidates for the virtual communities; creation, from the candidates, of a list of the members of each virtual community in a buddy list management unit in the presence enabled network; notification of the buddy list by the list management unit to client units in the user equipment of members of the community; and displaying the notified list on the user equipment of each member receiving it.

US Patent Application No. 2005/243,978 (Son et al.) entitled "System and method of interworking messages between mobile communication terminals" discloses a system for inter-working messages of a mobile communications terminal employing a method of receiving by a first messaging service server a multimedia message sent by a first user client of a first messaging service, processing the multimedia message at the first messaging service server and at a second messaging service server, and providing by the second messaging service server the processed multimedia message to a second user client of a second messaging service. The message includes a parameter that indicates the originating messaging service type or the recipient messaging service type as a field or an indicator in the header portion or body portion of the message.

US Patent Application No. 2006/53,227 (Ye et al.) entitled "Multi-media messaging" discloses methods, systems, and machine-readable mediums for creating multimedia messaging service (MMS) messages. In one embodiment, the method comprises receiving a message in a first format, adapting the message to a MMS message, and sending the MMS message to a user device.

US Patent Application No. 2006/146,997 (Qian et al.) entitled "Communications system and method for providing customized messages based on presence and preference information" discloses communication systems which when a caller requests a communication session, e.g., voice, text or multimedia, with a callee, but due to the unavailability of the callee, the communication session is unable to be established, a message is generated and transmitted to the caller based only on the callee's presence information. Current systems have the disadvantage that they do not allow a callee to provide different presence information to different callers. This disadvantage is overcome by the application in that a communication manager which transmits a response to a caller has access to preference information which includes policies for different priority levels of callers. Thereby the response can be customized to said caller. In particular, the preference information of the called subscriber determines the type and amount of the called subscriber's presence information that is disclosed to the caller in the customized message.

SUMMARY OF THE INVENTION

In accordance with certain aspects of the present invention, there is provided a system for message communication via a communication media between one or more originating communication devices assigned to a sender and one or more destination communication devices assigned to a receiver, the system comprising an access block configured to receive, directly or indirectly, from at least one originating communication device a message having initial characteristics comprising message format and message layout, and to transmit the message to at least one destination communication device; a media block operatively coupled to said access block and configured to adapt, before transmitting, at least one of said initial characteristics of the message in accordance with at least one criterion selected from a group comprising:
 i) criterion related to message communication capabilities of the destination communication device with regard to message communication capabilities of the originating communication device;
 ii) criterion related to message displaying capabilities of the destination communication device with regard to message communication capabilities of the originating communication device;
 iii) criterion related to the communication media.

The system may be further configured to support at least two destination communication devices assigned to the receiver and further comprise a database operatively coupled to the media block and configured to store historical information and/or derivatives thereof related to the message communication by the sender and/or the receiver, and a destination block operatively coupled to said media block and said database and configured to process at least part of said historical information with the help of one or more algorithms, and to estimate, in accordance with certain criterion, preferred destination communication device among the destination communication devices assigned to the receiver.

The certain criterion may be related, for example, to predicted availability of certain destination device among the destination communication devices assigned to the receiver; to predicted reply time from certain destination device among the destination communication devices assigned to the receiver; one or more combinations thereof, etc. The certain algorithm may be, for example, predictive, learning, adaptive algorithms, combined, etc.

In accordance with further aspects of the present invention, the processing further includes processing data related to receiver's preferences, sender's preferences; indications of actual availability of the destination communication devices assigned to the receiver, etc.

In accordance with further aspects of the present invention, the system may be further configured to receive a template-based message, said template characterized by at least unique identifier and an initial layout, wherein the system further configured to recognize the unique identifier of the template, and the media block is further configured to adapt, before transmitting, the initial layout of the message in accordance with the recognized unique identifier and displaying capabilities of the destination communication device.

In accordance with other aspects of the present invention, there is provided a block configured to obtain a template-based message to be communicated between one or more originating communication devices assigned to a sender and one or more destination communication devices assigned to a receiver, said template characterized by at least unique identifier and an initial layout, wherein said block is further configured to obtain information related to said unique template's identifier, and to adapt the initial layout of the message in accordance with said unique identifier and displaying capabilities of the destination communication device.

In accordance with other aspects of the present invention, there is provided a block configured to obtain a message to be communicated between one or more originating communication devices assigned to a sender and one or more destination communication devices assigned to a receiver, wherein said block is further configured to obtain historical information and/or derivatives thereof related to the message communication by the sender and/or the receiver, to process at least part of said information with the help of one or more algorithms, and to estimate, in accordance with certain criterion, preferred destination communication device among the destination communication devices assigned to the receiver.

In accordance with other aspects of the present invention, there is provided a method of message communication via a messaging system between one or more originating communication devices assigned to a sender and one or more destination communication devices assigned to a receiver, the method comprising:
 a) before delivery to the receiver, obtaining by a messaging system a message having initial characteristics comprising message format and message layout;
 b) adapting at least one of said initial characteristics of the message in accordance with at least one criterion selected from a group comprising:
  i) criterion related to message communication capabilities of the destination communication device with regard to message communication capabilities of the originating communication device;
  ii) criterion related to message displaying capabilities of the destination communication device with regard to message communication capabilities of the originating communication device;
  iii) criterion related to communication media between originating and destination device;

c) facilitating delivery of the adapted message to the receiver.

The method may further comprise obtaining historical information and/or derivatives thereof related to the message communication by the sender and/or the receiver, processing at least part of said historical information with the help of one or more algorithms; and estimating, in accordance with certain criterion, preferred destination communication device among the destination communication devices assigned to the receiver.

In accordance with other aspects of the present invention, there is provided a method of message communication via a messaging system between one or more originating communication devices assigned to a sender and one or more destination communication devices assigned to a receiver, the method comprising:
- a) before delivery to receiver, obtaining by the messaging system a template-based message having initial characteristics comprising message format and message layout; said template characterized by at least unique identifier and an initial layout,
- b) obtaining information related to said unique template's identifier; and
- c) adapting the initial layout of the message in accordance with the said unique identifier and displaying capabilities of the destination communication device.

Said adapting may be provided, for example, by the messaging system and/or by the originating device.

The method may further comprise storing the message with initial characteristics related to message format and message layout in the messaging system; receiving from the destination device the adapted message received by the receiver and to be forwarded to a forwarding address; replacing the adapted message with the corresponding message stored in the messaging system; and facilitating delivery of the message with initial characteristics to the forwarding address. Said replacing may be provided per the receiver's request.

In accordance with other aspects of the present invention, there is provided a service center for message communication between one or more originating communication devices assigned to a sender and one or more destination communication devices assigned to a receiver, the service center facilitating:
- a) before delivery to receiver, obtaining a message having initial characteristics comprising message format and message layout;
- b) adapting at least one of said initial characteristics of the message in accordance with at least one criterion selected from a group comprising:
  - i) criterion related to message communication capabilities of the destination communication device with regard to message communication capabilities of the originating communication device;
  - ii) criterion related to message displaying capabilities of the destination communication device with regard to message communication capabilities of the originating communication device;
  - iii) criterion related to communication media between originating and destination device;
- c) facilitating delivery of the adapted message to the receiver.

The service center may further facilitate obtaining historical information and/or derivatives thereof related to the message communication by the sender and/or the receiver; processing at least part of said historical information with the help of one or more algorithms; and estimating, in accordance with certain criterion, preferred destination communication device among the destination communication devices assigned to the receiver.

In accordance with other aspects of the present invention, there is provided a service center for message communication via a messaging system between one or more originating communication devices assigned to a sender and one or more destination communication devices assigned to a receiver, the service center facilitating:
- a) before delivery to receiver, obtaining a template-based message having initial characteristics comprising message format and message layout; said template characterized by at least unique identifier and an initial layout,
- b) obtaining information related to said unique template's identifier; and
- c) adapting the initial layout of the message in accordance with the said unique identifier and displaying capabilities of the destination communication device.

In accordance with other aspects of the present invention there is provided a client for a communication device configured to facilitate via a messaging system a message communication of a originating communication device assigned to a sender and one or more destination devices assigned to a receiver, said client being installed at originating device configured to facilitate composing a message having initial characteristics comprising message format and message layout and adapting at least one of said initial characteristics of the message in accordance with at least one criterion selected from a group comprising:
- i) criterion related to message communication capabilities of the destination communication device with regard to message communication capabilities of the originating communication device;
- ii) criterion related to message displaying capabilities of the destination communication device with regard to message communication capabilities of the originating communication device;
- iii) criterion related to communication media between originating and destination device;

The client may be configured to obtain historical information and/or derivatives thereof related to the message communication by the sender and/or the receiver, to process at least part of said information with the help of one or more algorithms, and to estimate, in accordance with certain criterion, preferred destination communication device among the destination communication devices assigned to the receiver.

In accordance with other aspects of the present invention, there is provided a client for a communication device configured to facilitate via a messaging system a message communication of a originating communication device assigned to a sender and a destination devices assigned to a receiver, said client being installed at originating device configured to facilitate composing a message using a template characterized by at least unique identifier and an initial layout, wherein said client is further configured to adapt the initial layout of the message in accordance with said unique identifier and displaying capabilities of the destination communication device.

Among advantages of certain aspects of the present invention is capability of ubiquitous messaging between different types of communication devices via different communication protocols, adapting the sending/receiving message in accordance with capabilities of the destination communication device and the communication media and preserving user's messaging experience over a spectrum of communication devices.

BRIEF DESCRIPTION OF THE DRAWINGS

In order to understand the invention and to see how it may be carried out in practice, certain embodiments will now be described, by way of non-limiting example only, with reference to the accompanying drawings, in which.

DETAILED DESCRIPTION OF EXEMPLARY EMBODIMENTS

Figure 1:
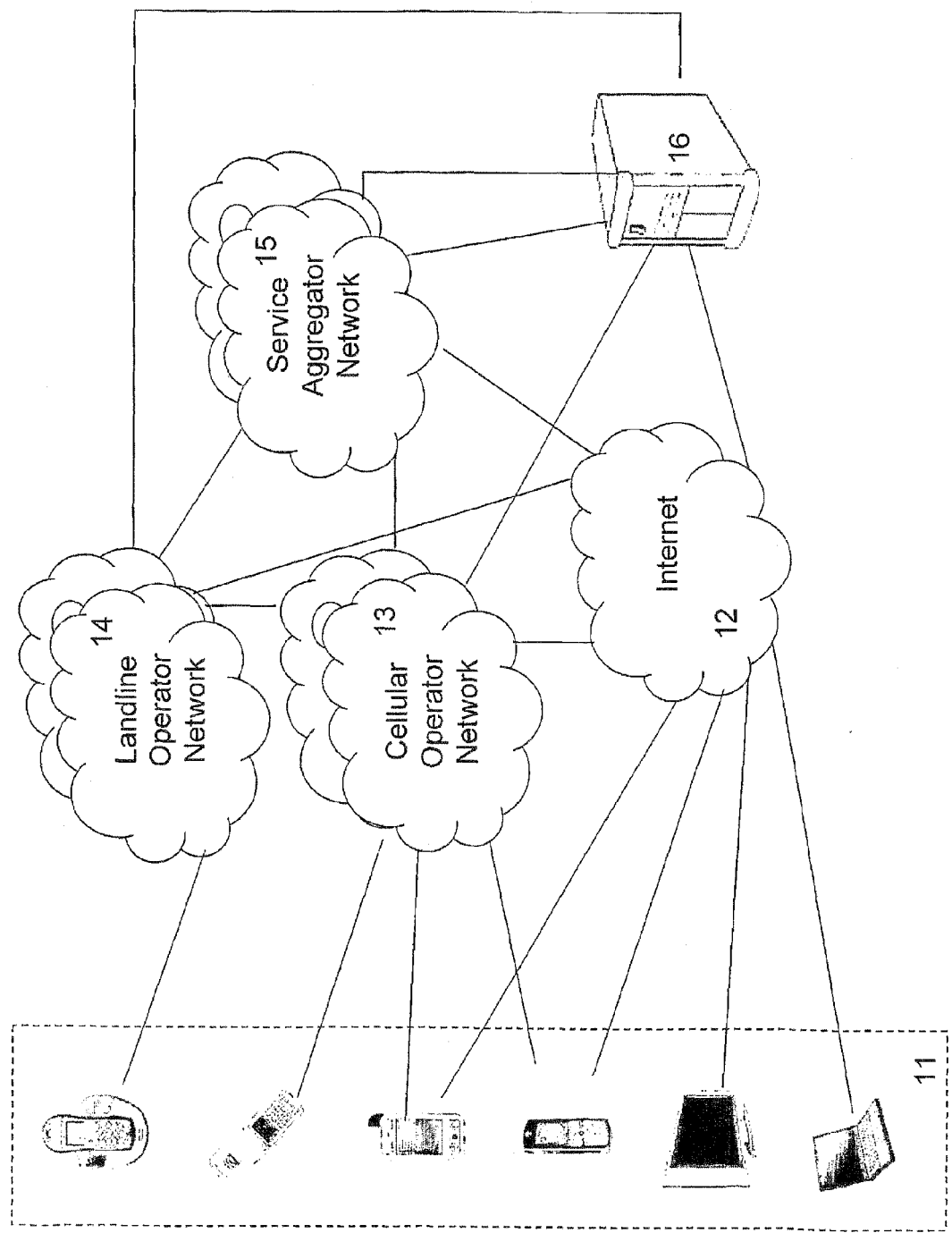
FIG. 1 illustrates a generalized diagram of exemplary network architecture supporting message communication in accordance with certain embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and description, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, Disk-on-Key, smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions capable of being conveyed via a computer system bus.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The term "communication device" used in this patent specification should be expansively construed to include any kind of CPE (customer premises equipment) device with messaging communication capabilities, including those adapted for coupling with voice, data, video and/or multimedia terminals. The "communication devices" include fixed (e.g. DECT) and cellular phones, personal and other computers, pagers, radio telephones, dedicated data units (e.g. PDA), TV set-up boxes, digital media centers, etc. The communication device may communicate, directly or indirectly, with another communication device or with other devices (e.g. servers, public switches, service platforms, etc.) via all possible networks such as, e.g. fixed line networks, cellular networks, broadband networks, data communication networks, Internet network, cable networks, etc. using any standard or proprietary protocols supporting message communication.

The term "message" used in this patent specification should be expansively construed to include any kind of communication objects capable to be exchanged between communication devices. Said communication objects are characterized by content, format and layout. The message formats include formats fitting e-mail, Short Message Service, instant messaging, EMS, MMS, SyncML, or/and other electronic messaging services, communication media and protocols thereof. The message content may include a text and/or one or more media items to be transmitted to the other party, wherein the media items may include text files, image files, moving picture files, sound files, hyperlinks, electronic signatures, etc. in any available formats. The message may be sent as one entity, as multiple entities to be re-assembled when received, one or more media items may be replaced by corresponding links, etc. The media items contained in the message, when received, may be displayed as independent objects (e.g. attachments) in accordance with a predefined layout, in a predetermined order (e.g. in a synchronized multimedia message) or otherwise. Some messages may also comprise metadata describing, for example, a structure and/or semantics of the contained media items. The metadata may carry rules and instructions (e.g. how the message or parts thereof shall be delivered, played, forwarded, stored, etc.), a counter and any other information which may aid in protecting or initiating commercial or non commercial interactions with the message. The metadata may also include tags associated with the message (e.g. for future filing and/or searching of messages and content elements thereof, etc.), "threads" providing association with other messages, etc. The metadata may include information related to digital rights pertaining to the message or parts thereof and/or any other predestinated rule.

The term "message template" used in this patent specification should be expansively construed to include any kind of predefined user interface related to content and/or layout of transmitted and/or received message. Typically the template comprises a pre-existing text, and/or spaces to be filled and/or media items and/or menu elements and/or buttons and/or checkboxes to be filled/selected.

The term "criterion" used in this patent specification should be expansively construed to include any compound criterion, including, for example, several criteria and/or their combination.

The references cited in the background teach many principles of integrated messaging services that are applicable to the present invention. Therefore the full contents of these publications are incorporated by reference herein where appropriate for appropriate teachings of additional or alternative details, features and/or technical background.

Bearing this in mind, attention is drawn to FIG. 1 illustrating, by way of non-limiting example, a generalized diagram of exemplary network architecture supporting message communication in accordance with certain embodiments of the present invention.

Each of communication devices 11 (e.g. IP or regular cellular phone, DECT telephone, personal computer, PDA, TV, etc.) is connected via appropriate protocol supporting at least one message service to at least one of the networks selected from the group comprising Internet 12 or other data network, one or more networks 13 operated by a cellular operator, and one or more networks 14 operated by a landline operator. Some of these networks are connected with one or more other networks directly or via one or more networks 15 operated by a service aggregator and supporting at least one inter-network message service. The networks and/or combinations thereof comprise necessary service platforms (e.g. e-mail server, WAP server, SMSC, etc.) facilitating messaging communication known in the prior art, variants and evolution thereof. In accordance with certain embodiments of the present invention the message communication between a message originating communication device (referring hereinafter as originating device) and a message destination communication device (referred hereinafter as destination device) is provided via a system for message communication (referred hereinafter as "messaging system") 16. The messaging system is connected, directly or via service aggregator, with one or more networks connected to the originating device and one or more networks connected to the destination device. The originating and destination devices may have different communication and displaying capabilities and may use different communication protocols.

Note that the invention is not bound by the specific network architecture described with reference to FIG. 1. Those versed in the art will readily appreciate that the invention is, likewise, applicable to any network architecture facilitating messaging between communication devices. The messaging system(s) may constitute a part of cellular operator network(s) 13 and/or landline operator network(s) 14 and/or service aggregator network(s) 15. The functionality of the message platform described in the present invention may be implemented in one or more stand-alone servers or, fully or partly, integrated with one or more other service and/or application platforms existing in one or more networks. The integration may be provided in a different manner and implemented in software and/or firmware and/or hardware.

Figure 2:
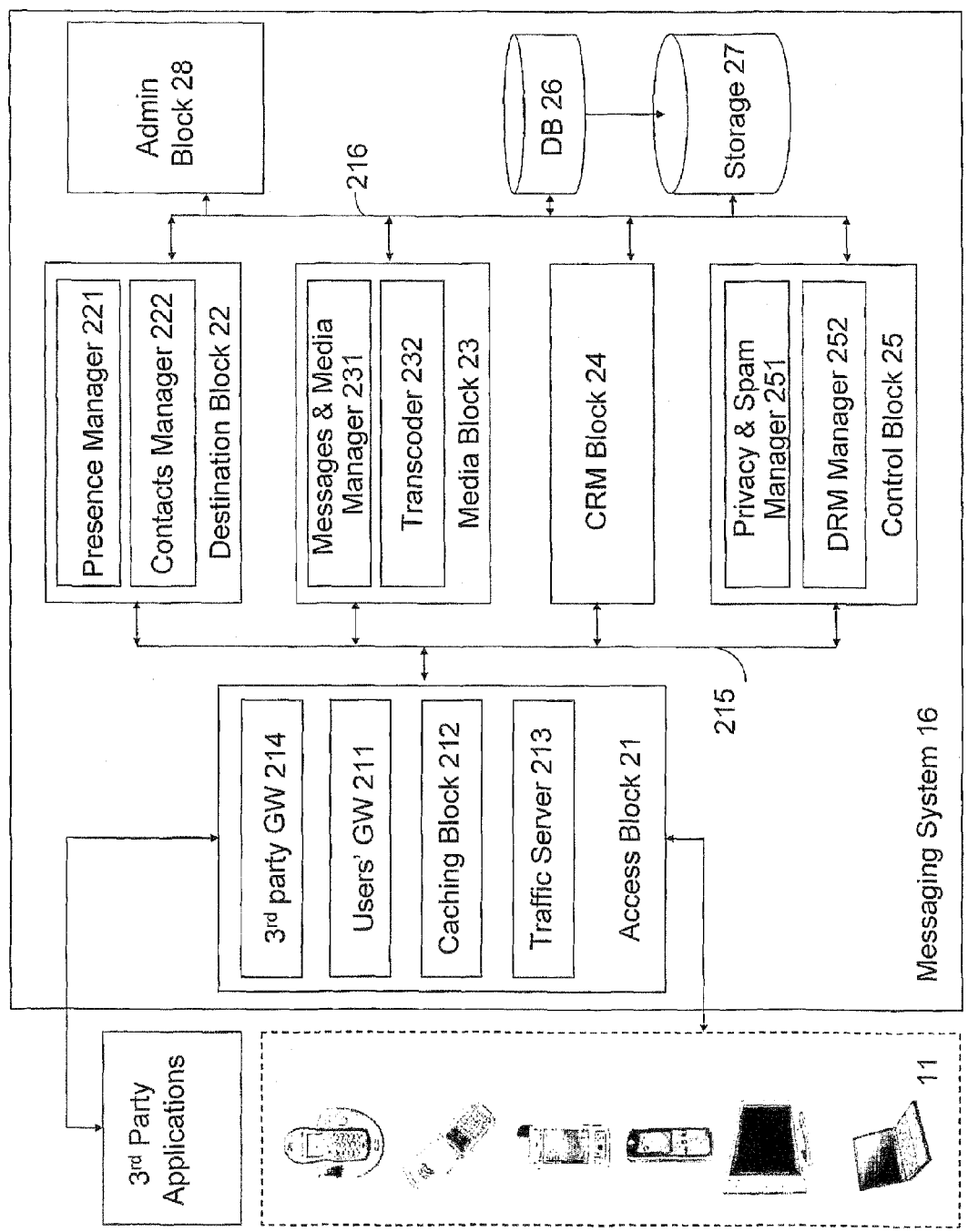
FIG. 2 illustrates a generalized block diagram of a functional architecture of a messaging system in accordance with certain embodiments of the present invention.

Referring now to FIG. 2, there is illustrated a generalized block diagram of a functional architecture of a messaging system in accordance with certain embodiments of the present invention.

As illustrated in FIG. 2, in accordance with certain embodiments of the present invention, one or more originating communication devices are operatively coupled with one or more destination communication devices via the messaging system 16, wherein at least one communication device is assigned to a user registered in the messaging system (subscriber), The messaging system 16 may support communication devices with different capabilities as well as communicate with $3^{rd}$ party applications 29. The messaging system is configured to support a variety of message formats, including, but not limiting, text (including rich text), video format (e.g. MPEG family, WMV family, 3GPP, etc.), audio format (e.g. AMR family, MPEG audio layers, AAC, MIDI, etc.), image format (e.g. WEG, GIF, BMP etc.), and others. The messaging system is configured to facilitate delivery of the message and/or notification thereof to the destination device.

The messaging system is also configured to support, at least, the following modes of user's access:
  Using an existing communication interface and/or standard client of a communication devices (email, SMS, MMS, IM, etc.);
  Using a dedicated client pre-installed on the communication device;
  Using a dedicated client remotely delivered to the communication device using some web-like browser (Web, WAP, etc).

The dedicated clients may be fully or partly standard and/or proprietary, including clients provided by $3^{rd}$ parties. In certain embodiments of the invention some functionality of the messaging system may be delegated to a client as will be further detailed with reference to FIGS. 7-9. In certain communication devices functionality (or part thereof) of the client may be implemented also in hardware and/or firmware.

Accordingly, the messaging system 16 is configured to support different clients as, for example, mobile clients, PC clients, web clients, TV clients, WAP clients, etc., wherein each of the clients is matched to the capabilities of the appropriate communication device. Some of the clients may also complement the device capabilities; for example, the TV client may be based on the middleware of the TV STB and rely on the 'Lean back' TV approach. The TV client may comprise highly developed messages scanning and reading options as well as chat or SMS messaging.

The messaging system 16 may be also configured to recognize metadata (if any) contained in the message and to operate in accordance with system instructions related to metadata and/or instructions contains in metadata. In certain embodiments of the present invention the destination device may recognize a presence of metadata (e.g. related to digital rights) and send request to the messaging system. The messaging system may be, accordingly, configured to receive said request and to provide the destination device with instructions related to handling the message and/or parts thereof (e.g. block forward, play, decrease counter(s), etc.).

The messaging system 16 comprises an access block 21 operatively coupled with several interconnected (e.g. via one or more buses 215) functional blocks: a destination block 22, a media block 23, a CRM block 24 (optionally) and a control block 25 (optionally). Said functional blocks are operatively coupled (e.g. via one or more buses 216) with a database 26, a storage 27 and an administrative block 28 (optionally). The functional blocks may comprise data repository, logic and processing capabilities related to the function of the block.

The access block 21 includes a users' gateway 211 and $3^{rd}$ party applications' gateway 214 supporting communication with communication devices and $3^{rd}$ party application(s) via corresponding network(s) (e.g. public switched and private fixed line networks, cellular networks, broadband networks, data communication networks, Internet, cable networks, etc.) via available communication standard, system and/or protocol (e.g. XMPP, HTTP, WAP, SMS, MMS, SMTP, etc.) and variants of evolution thereof. It should be noted that unless specifically stated otherwise, the communication with communication device includes communication via device's interface(s), standard client(s) and/or dedicated client(s) installed at the communication devices.

The users' gateway 211 is connected with a traffic management server 213 via a cashing layer block 212 also constituting a part of the access block. A user can register and thus to become a subscriber as well as subscribe to and/or purchase one or more services or combinations thereof via the users' gateway. Upon registration the system assigns to the subscriber a unique identification number (e.g. number of his/her cellular phone), wherein the subscriber may have more than one assigned communication devices.

The functionality of the destination block 22 and the media block 23 as well as the traffic management server 213 will be further detailed with reference to FIGS. 3-5.

In accordance with certain embodiments of the present invention, the messaging system 16 is configured to assign a personal account to the subscriber. The personal account comprises information related to the subscriber (including assigned communication devices) and settings related to the purchased/subscribed service(s). A service is characterized by a certain set of functions, limits, capabilities, quality of service and other service-related characteristics. The CRM block 24 is configured to manage and control creation and maintenance of the personal accounts. The CRM block further comprises a session manager (not shown). A term "session" used in this patent specification should be expansively construed to include any logical 3-way relationship between two communication devices and the messaging system, wherein at least one communication device is assigned to a subscriber. It should be noted that, similar to e-mail and/or SMS sessions, the sending part and receiving parts of the session may be separated in time. A session is started by a user and terminated by said user or by the messaging system. The CRM block is configured to register session(s)-related information, to match it with corresponding personal accounts and to prepare data for further billing purposes. The data and/or derivatives thereof obtained by the CRM block may be stored in the database 26.

The control block 25 comprises a privacy/spam manager 251 and digital rights manager 252. The privacy, spam and the digital rights may be controlled and/or managed on a system level, subscriber level, group level and/or combination thereof. By way of non-limiting example, the subscriber may fully or partly deny the privacy rights to the benefits of another subscriber or subscribers' group; the spam may be controlled per subscriber/subscribers' group settings and/or per overall system settings; the digital rights for media items comprised in the messages may be managed per subscriber and/or per element (e.g. as combination of system and personal account settings, etc.), etc.

The database 26 stores data related to the subscribers, services, transactions, usage and other information related to the system operation. The database is coupled to the media storage device 27. The media storage device is configured to store media items contained in the originated messages and/or media items converted, if necessary, in accordance with certain embodiments of the present invention. Appropriate media items may be downloaded to the destination devices via relevant protocols, including but not limited to HTTP, SMTP, MMS, etc. Certain media items, e.g. items with too large volume for successful downloading, may be transmitted to the destination device with the help of streaming protocols, e.g. RTSP, RTP, etc. In certain embodiments of the invention the subscribers may have assigned storage space with configurable (e.g. per subscriber category, service, etc.) capacity. In certain embodiments of the invention the storage device is capable of on-line storing of originated message (including format, layout and content) for further message restoring if/when necessary. In certain embodiments of the present invention the system is configured to store in the storage device 27 one or more media items contained in the message, while to store at least part of metadata related to the message (e.g. tags, threads, etc.) in the database 26. Among advantages of such splitting is reduction of duplicating media items to be stored.

The administration management block 29 is configured to support service administrating (e.g. monitoring, reporting, system's tuning, manual user management, manual content management, system configuration, etc.).

Figure 3:
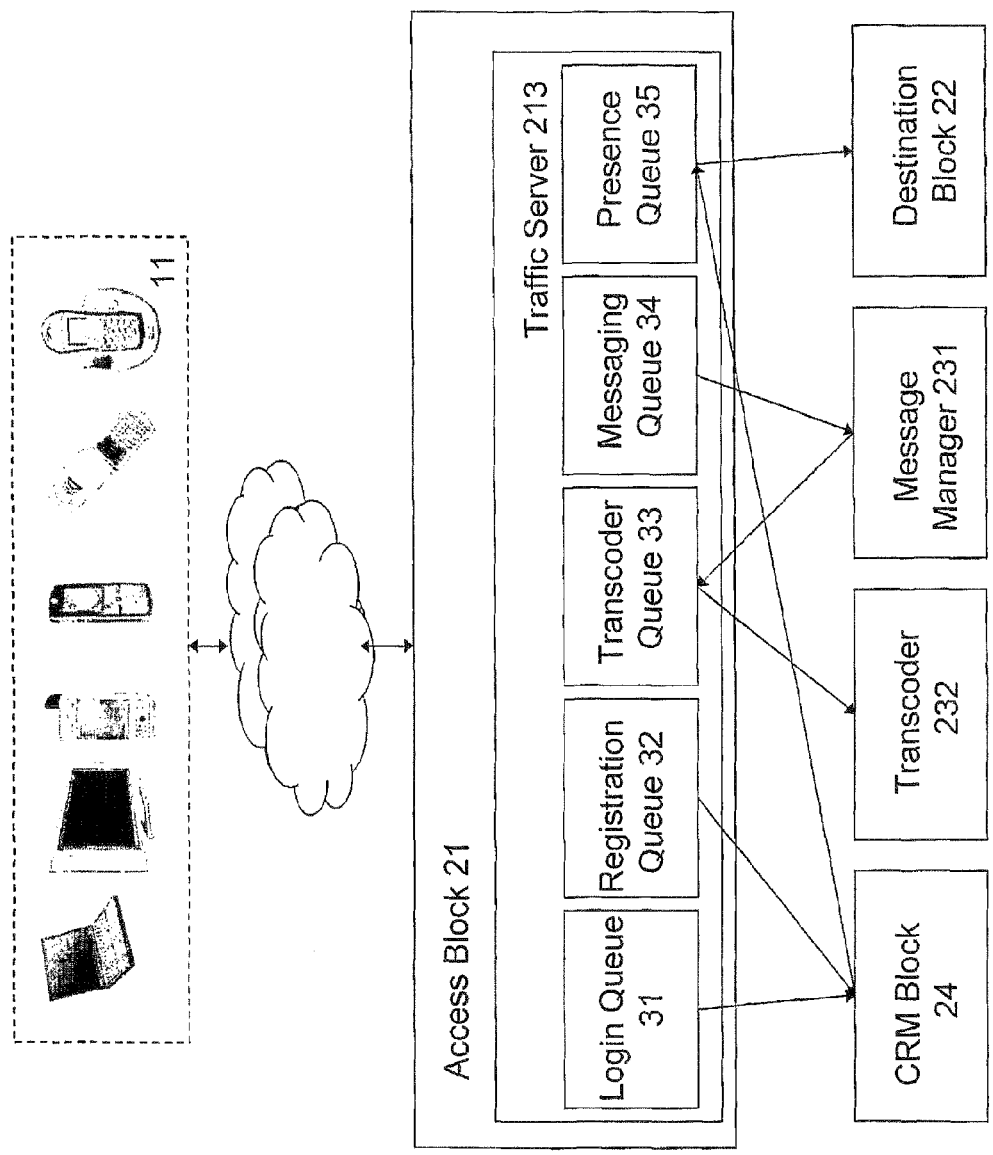
FIG. 3 illustrates a generalized block diagram of a functional architecture of a traffic management server in accordance with certain embodiments of the present invention.
Figure 4:
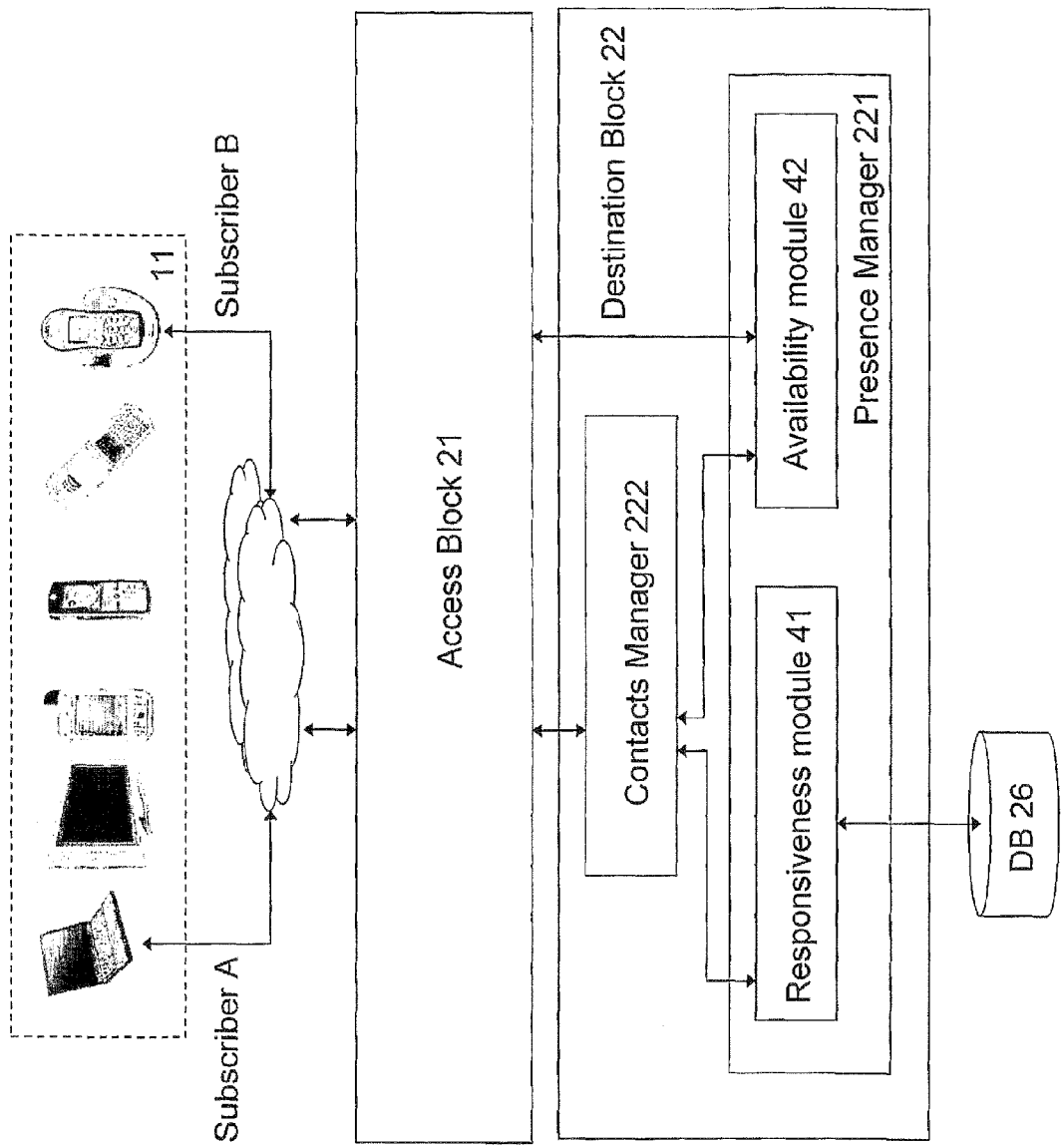
FIG. 4 illustrates a generalized block diagram of a functional architecture of a destination block in accordance with certain embodiments of the present invention.
Figure 5:
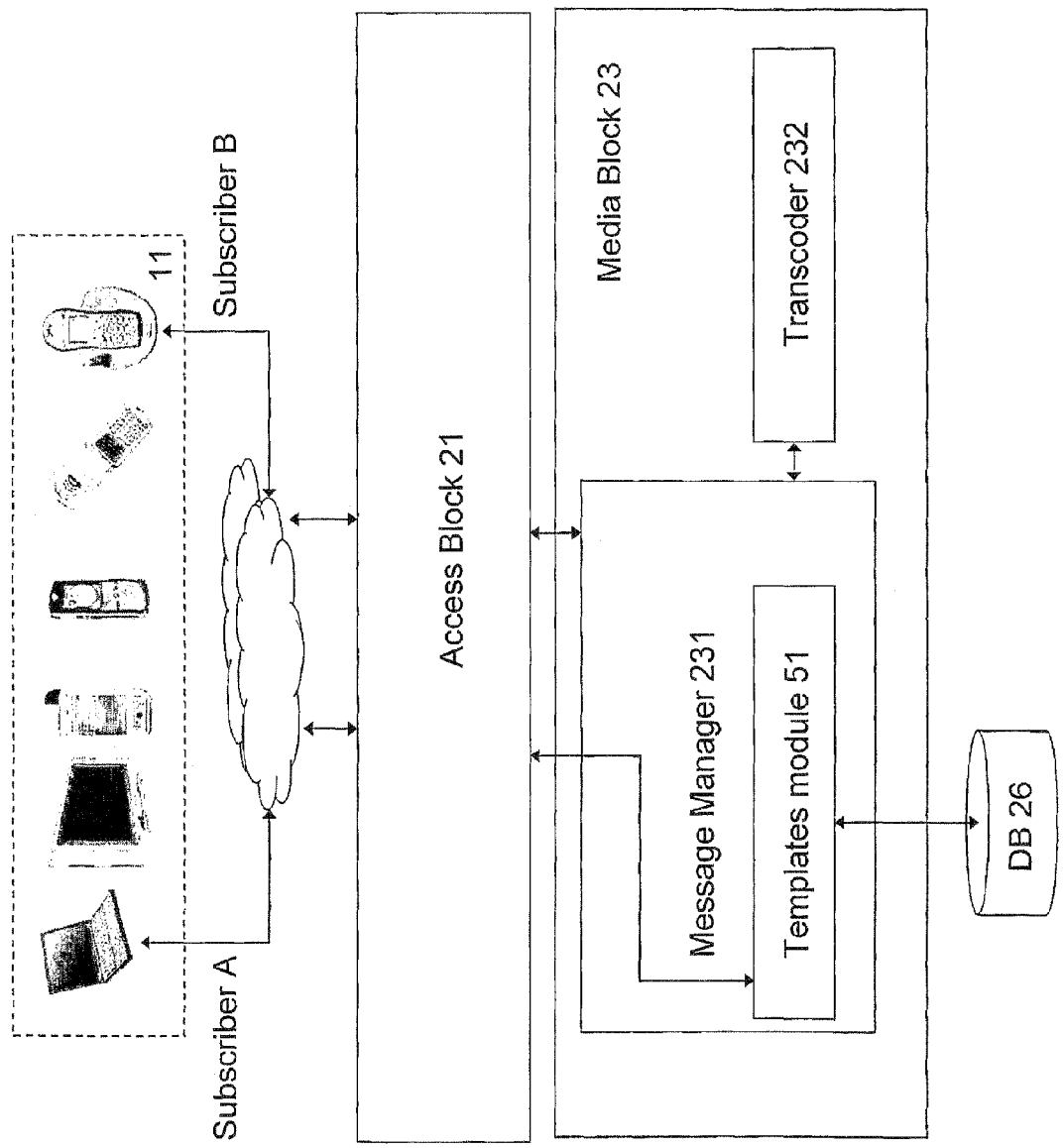
FIG. 5 illustrates a generalized block diagram of a functional architecture of a media block in accordance with certain embodiments of the present invention.

Those skilled in the art will readily appreciate that the invention is not bound by the configuration of FIG. 2 also as detailed in following FIGS. 3-5; equivalent and/or modified functionality may be consolidated or divided in another manner. In different embodiments of the invention, connection between the blocks and within the blocks may be implemented directly or remotely. The connection may be provided via Wire-line, Wireless, cable, Internet, Intranet, or other networks, using any communication standard, system and/or protocol and variants or evolution thereof. Those skilled in the art will also readily appreciate that the information related to subscribers, services, and/or usage and/or other information related to the system operation may be stored and managed within more than one database, some of these databases may be external to the system 16 and may be managed by $3^{rd}$ parties.

Referring to FIG. 3, there is illustrated a generalized block diagram of a functional architecture of the traffic management server 213. In accordance with certain embodiments of the present invention, the traffic management server 213 is configured to manage the message delivery within the messaging system 16. The traffic management server is configured to serve as an intersection of the system flows and to provide queues mechanism to manage (e.g. based on J2EE technologies) the flows of the internal traffic (between functional and other blocks and parts thereof) according to pre-defined functional queues, for example, a login queue 31, a registration queue 32, a transcoding queue 33, a media messaging queue 34, a presence queue 35, etc. For example, input traffic to the CRM block 24 is managed via the login queue and the registration queue, while presence related traffic from CRM block is managed via the presence queue also supporting input traffic to the destination block. The message coming to the message block 23 is passed via the messaging queue to a message manager 231 and then via the transcoding queue to the transcoder 232.

Referring now to FIG. 4, there is illustrated a generalized block diagram of a functional architecture of the destination block 22. In accordance with certain embodiments of the present invention, the destination block comprises a presence manager 221 operatively coupled with a contacts manager 222 and the database 26, wherein subscriber related information contained in the database comprises corresponding contact lists and history of communication by the originating and/or destination subscribers, including characteristics of previous deliveries (destination device, time of originating and delivery, reply time, number of attempts, etc.).

The contacts manager 222 is configured to manage a list of the subscriber's contacts (including groups). This list includes one or more communication devices assigned to said contact persons, capabilities of said devices, sender's and/or receivers' preferences, if any, related to destination device, message layout and/or format, etc. This information or parts thereof may be stored in the database 26. In certain embodiments of the invention said information or parts thereof and/or derivatives thereof may be stored in one or more external databases, and the contact manager may have capabilities to access such information.

The presence manager 222 comprises an availability module 42 operatively coupled with a responsiveness module 41. The availability module is capable of providing availability indication for one or more communication devices assigned to one or more subscribers comprised in the list managed by the contacts manager 222. The availability indication may be provided in accordance with one or more methods known in the art, combinations, variants and evolutions thereof. In certain embodiments of the invention the destination device may be determined among devices assigned to the receiver in accordance with indication of actual availability of certain device and/or sender/receiver/system preferences.

The responsiveness module comprises a processor with learning, predictive, adaptive and/or other algorithm capable of processing information related to appropriate communication history as stored in the database 26 and calculating a preferred destination device in accordance with a certain criterion. Said information may comprise data on using certain communication device (among assigned to the subscriber) under different circumstances, dependency of reply time of certain receiving device (among assigned to the receiver) under different circumstances, availability of different devices (among assigned to the receiver) under different circumstances, number of system's delivery attempts required under different circumstances or otherwise reflect communication habits and experience of the sender and/or the receiver and/or the pair thereof. In certain embodiments of the invention the criterion may be related to expected reply time (e.g. minimal reply time, average reply time, etc.) of different pairs of senders and receivers and/or pairs among assigned originating and destination devices; related to predicted availability (e.g. maximal availability, average availability, etc. of certain destination device among devices assigned to the receiver), etc. The calculations may further include sender's and/or receiver's preferences (e.g. related to the communication devices, message format and layout, etc.); settings comprised in the message (e.g. in metadata) and/or system and related to delivery instructions, digital rights management, etc.; actual availability indications provided by availability module and other parameters. The processing at least part of said information stored in the database and determining, in accordance with certain criterion, preferred destination communication device among the destination communication devices assigned to the receiver may further include analysis of communication habits/experience and/or preferences of a certain group of subscribers comprising the sender and/or receiver, and/or entire subscriber's database, and may, optionally, include data mining. In certain embodiments of the invention the results of calculations of preferred destination device and/or derivatives thereof may be saved in the database for later use.

In accordance with certain embodiments of the present invention and, as detailed further with reference to FIGS. 6-10, the messaging system is configured to obtain delivery instructions in accordance with received message and destination device, match the message format and layout to the destination device, and facilitate the delivery. In certain embodiments of the invention if, for some reason, the message is undeliverable to the preferred destination device, the messaging system is capable to define the destination device with next priority and to match the message accordingly. It should be noted that if the message is intended to be sent to several receivers, the process of determining the destination device and corresponding matching shall be provided in the similar manner for each receiver, unless other instructed.

Referring to FIG. 5, there is illustrated a generalized block diagram of a functional architecture of the media block 23. In accordance with certain embodiments of the present invention, the media block 23 comprises a transcoder 232 operatively coupled with a message manager 231 further optionally comprising a template module 51 operatively coupled with the database 26. The media block is configured to select the format and message layout fitting to the destination device and to convert the message accordingly before facilitating its delivery to the destination device. As will be further detailed with reference to FIGS. 6-10, the converting includes transcoding the message format and/or adapting the message layout. The required transcoding functionalities may be implemented based on different models of transcoders available in the markets, variants and evolutions thereof (e.g. "Bulk Messaging System" (BMS) product Vimatix, briefly described in http://www.vimatix.com/bms.htm). The message manager is configured to provide layout adaptation and/ore repackaging as further detailed with reference to FIGS. 6-10. The transcoding decision is based upon communication capabilities between originating and destination device, including supporting protocols, available bandwidth, etc.

Figure 6:
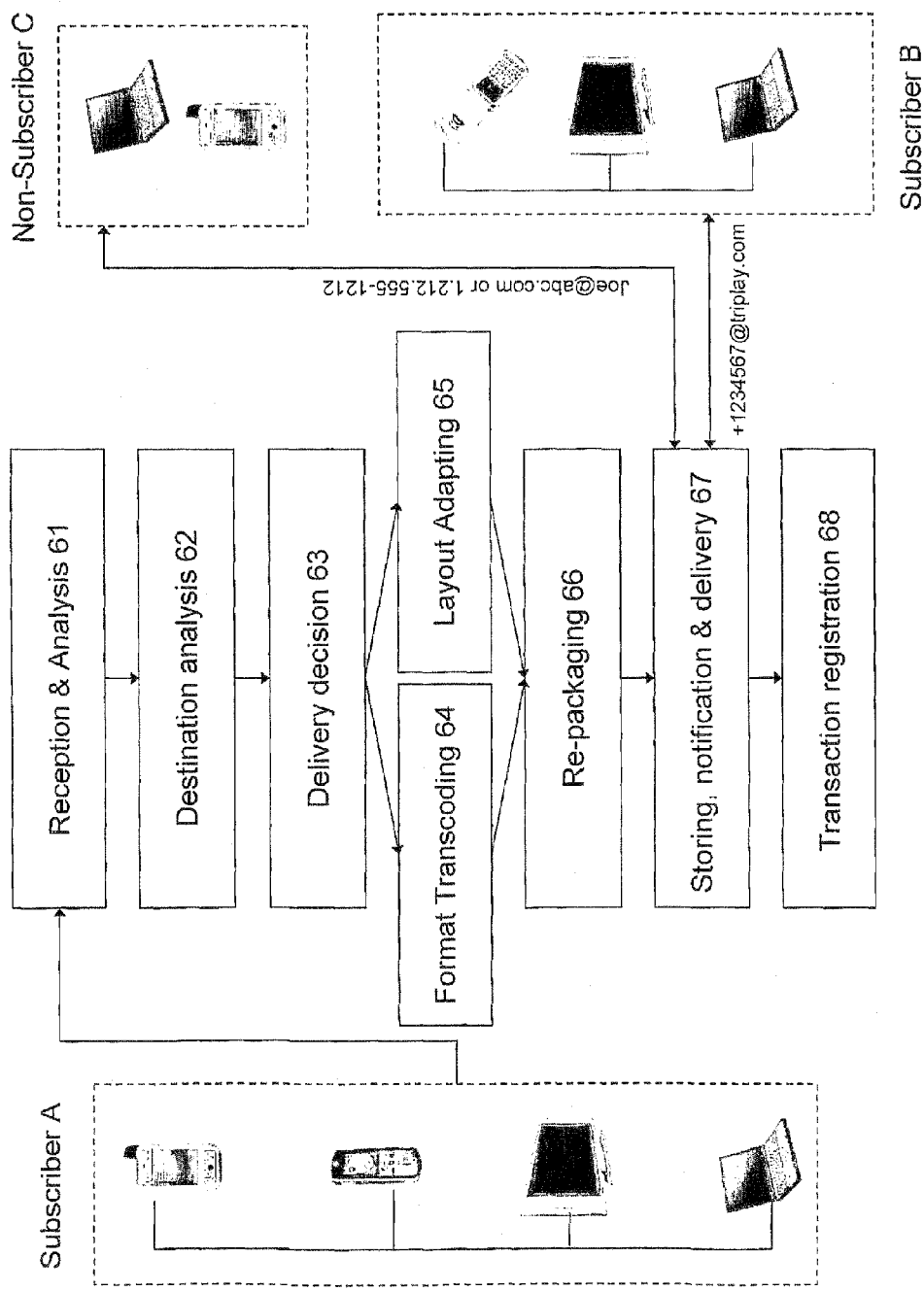
FIG. 6 illustrates a generalized flow chart of operating the messaging system in accordance with certain embodiments of the present invention.

Referring to FIG. 6, there is illustrated a generalized flow chart of operating the messaging system. In accordance with certain embodiments of the present invention, the messaging system 16 is connected with the networks 13, 14 and/or 15 illustrated in FIG. 1 in a manner that the message communication originated by the subscriber and/or designated to the subscriber shall pass through the messaging system. In the illustrated example Subscriber A composes a message at one of communication devices assigned to said subscriber and sends the message to Subscriber B and Non-subscriber C. As the message is originated by subscriber, it will be re-addressed to the messaging system 16. The messaging system receives the message and analyses 61 originating and destination addresses comprised in the message. If found that the destination device is assigned to a subscriber (e.g. per domain name assigned to the subscribers, IP address or other device attribute stored in the database, etc.), the system decides 62 on the destination device, and takes 63 a delivery decision accordingly. As was detailed with reference to FIG. 4, the decision may be provided basing on actual data (e.g. actual availability, preferences, etc.), on predicted or otherwise analyzed data (e.g. predicted availability, predicted preferences, receiver's availability pattern, etc.) or on combination thereof. The delivery decision comprises delivery instructions with regard to destination device(s) and/or content and/or format and/or layout of the message to be delivered. The delivery instructions or parts thereof may be received with the message (e.g. contained in the metadata), extracted and provided accordingly, and/or may be pre-defined in the system (e.g. in a form of a lookup table providing matching between originating device and/or destination device and format and/or layout of the message to be converted for delivery). The non-limiting examples of delivery decisions will be further illustrated with reference to FIGS. 7-10. In accordance with the delivery decision the system provides transcoding of the message format 64 and/or adapting layout 65 and appropriate repackaging 66 if necessary (for example, if limitations by communication media and/or destination device, and/or DRM-related instructions or other reasons require deleting or replacing some of media items comprised in the message). The converted message and/or notification thereof are delivered 67 to the destination device, and the transaction is registered 68 in the system. The original and/or converted messages may be stored in the system. The described process may be provided in a similar manner for several destination devices if the message from Subscriber A shall be delivered to several destination devices assigned to the same or different receivers.

Those versed in the art will readily appreciate that the illustrated operational flowchart is, likewise, applicable to message communication originated by a non-subscriber and designated to the subscriber.

The illustrated operational flowchart is also applicable to a message replying and/or message forwarding from destination device. In accordance with certain embodiments of the present invention the system may be further configured to forward the original message stored in the system and not the converted message received by the forwarding device. The decision what of these two messages to select may be provided by user and/or by system in accordance with certain rules (e.g. "use an original message for forwarding mode", "use a converted message for edit and forward mode", etc.).

Figure 7:
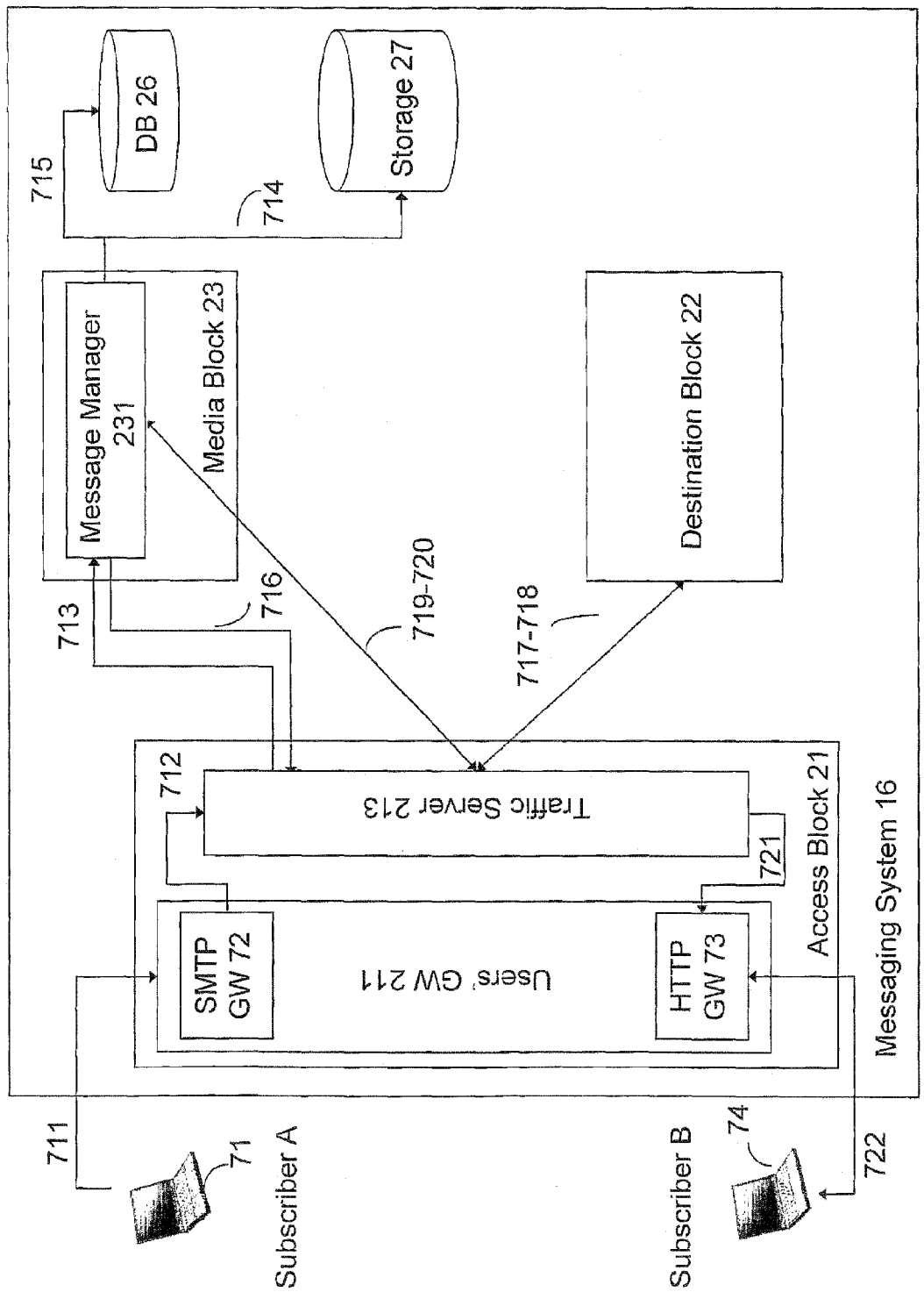
FIG. 7 illustrates a generalized flow diagram of messaging between PC and Web clients in accordance with certain embodiments of the present invention.

Referring to FIG. 7, there is illustrated, by way of non-limiting example, a generalized flow diagram of messaging between two subscribers wherein the originating device 71 is a desktop PC communicating with a destination PC 74 configured as a browser-based client.

The subscriber A composes a message at originating device 71 and sends 711 it to the subscriber B. The assumption of the current scenario is that the subscriber A does not select the destination device and addresses the message to the subscriber B in accordance with the subscriber's unique name registered in the system (e.g. in format <cellular telephone number of subscriber B>@<domain name assigned to the messaging system/service>). The message is passed to the messaging system 16 and received via SMTP gateway 72 constituting a functional part of the user's gateway 211 in the access block 21. The SMTP gateway parses the message and sends 712 the message to the traffic server, the traffic server passes 713 the message to the message manager constituting a functional part of the media block. In parallel the user's gateway identifies the originating device and informs the destination block (not shown). The message manager sends 714 the message media items to be stored in the storage 27 and sends 715 metadata related to said media items and/or said message to be stored in the DB 26. The message manager sends 716 an origination/destination request to the traffic server which passes 717 the request to the destination block 22. The destination block returns 718 the answer to the message manager. The destination may be defined in a manner detailed with reference to FIG. 4. The traffic manager passes 719 the answer ("PC client"/"web client" in the current example) to the message manager, and the message manager obtains the delivery instructions, including message format and layout, matching to the destination device, In the current example the delivery instructions are the following: deliver the message to HTTP server without changing the message format/layout, and notify the destination device. Accordingly, the message manager passes 720 the message to the traffic server and the traffic server passes 721 the message to the HTTP gateway 73 constituting a functional part of the user's gateway. Subscriber B receives 722 a notification about the message and may download its content.

Those skilled in the art will readily appreciate that in certain embodiments of the invention the SMTP, HTTP and other gateways and combinations thereof illustrated in the current and following examples may be implemented as physical part(s) of the messaging system, separate unit(s) located in the networks of cellular and/or landline operators and/or service integrator(s), or may be fully or partly integrated with one or more devices comprised in said networks.

Figure 8:
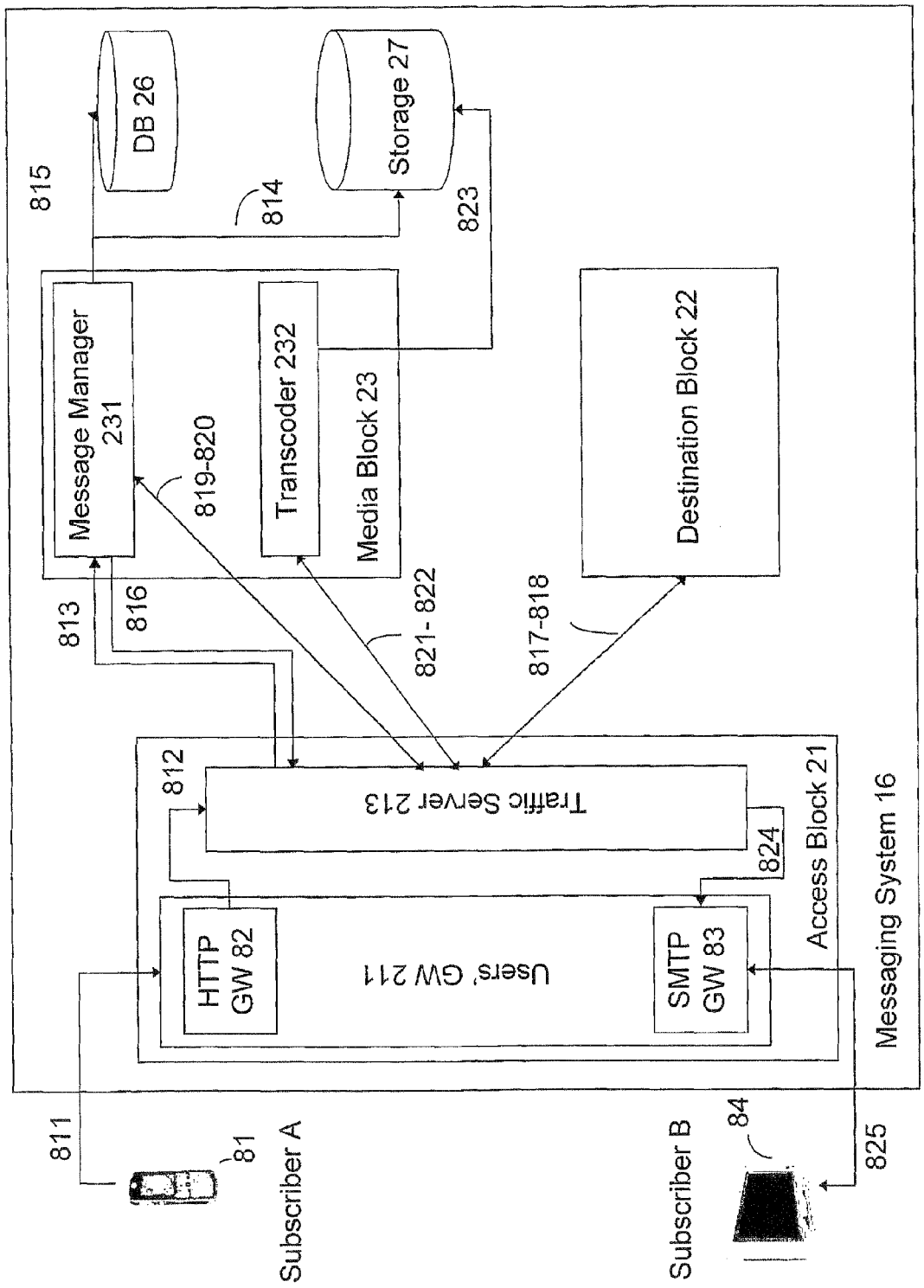
FIG. 8 illustrates a generalized flow diagram of messaging between mobile WAP and TV clients in accordance with certain embodiments of the present invention.

Referring to FIG. 8, there is illustrated a generalized flow diagram of messaging between two subscribers wherein the originating device 81 comprises WAP client and the destination device 84 comprises TV client. Similar to the scenario described with reference to FIG. 7, the subscriber A composes a message at originating device 81 and sends 811 it to the subscriber B. The assumption of the current scenario is that the subscriber A does not select the destination device and addresses the message to the subscriber B in accordance with the subscriber's unique name registered in the system. The message is passed to the messaging system 16 and received via HTTP (WAP) gateway 82 constituting a functional part of the user's gateway 211 in the access block 21. The HTTP gateway identifies the originating device, parses the message and sends 812 it to the traffic server, the traffic server passes 813 the message to the message manager constituting a functional part of the media block. The message manager sends 814 the message media items to be stored in the storage 27 and sends 815 the related metadata or part thereof to be stored in the DB 26. The message manager sends 816 an origination/destination request to the traffic server which passes 817 the request to the destination block 22. The destination block returns 818 the answer to the message manager. The traffic manager passes 819 the answer ("WAP client/"TV client" in the current example) to the message manager, and the message manager obtains the delivery instructions, including message format and layout, matching the destination device/client. In the current example the delivery instructions are the following: match the message format to delivery via SMTP server and message layout to displaying via TV client and notify the destination device about the message. Accordingly, the message manager passes 820 the message to the traffic server and the traffic server passes 821 the message to the media block 23. The media block provides a conversion of message format/layout to those matching the received delivery instructions and sends 823 the converted message to be stored in the storage 27 and informs 822 the traffic server. (If necessary for certain implementations of transcoding process, the transcoder may be further configured to obtain information about originating device from the user's gateway). Accordingly, the traffic server informs the message manager (not shown), and the message manager obtains a copy of converted message from the storage and sends it to the traffic server (not shown). The traffic server passes 824 the message to the SMTP gateway 83 sending notification 825 to the Subscriber B. The Subscriber B will receive the notification via local SMTP client embedded in the TV client and download the message. Alternatively, the media server may send to the traffic server and, accordingly, to SMTP server only information related to storage location of the converted message and retrieve said converted message and facilitate its sending per request received from the subscriber B.

Figure 9:
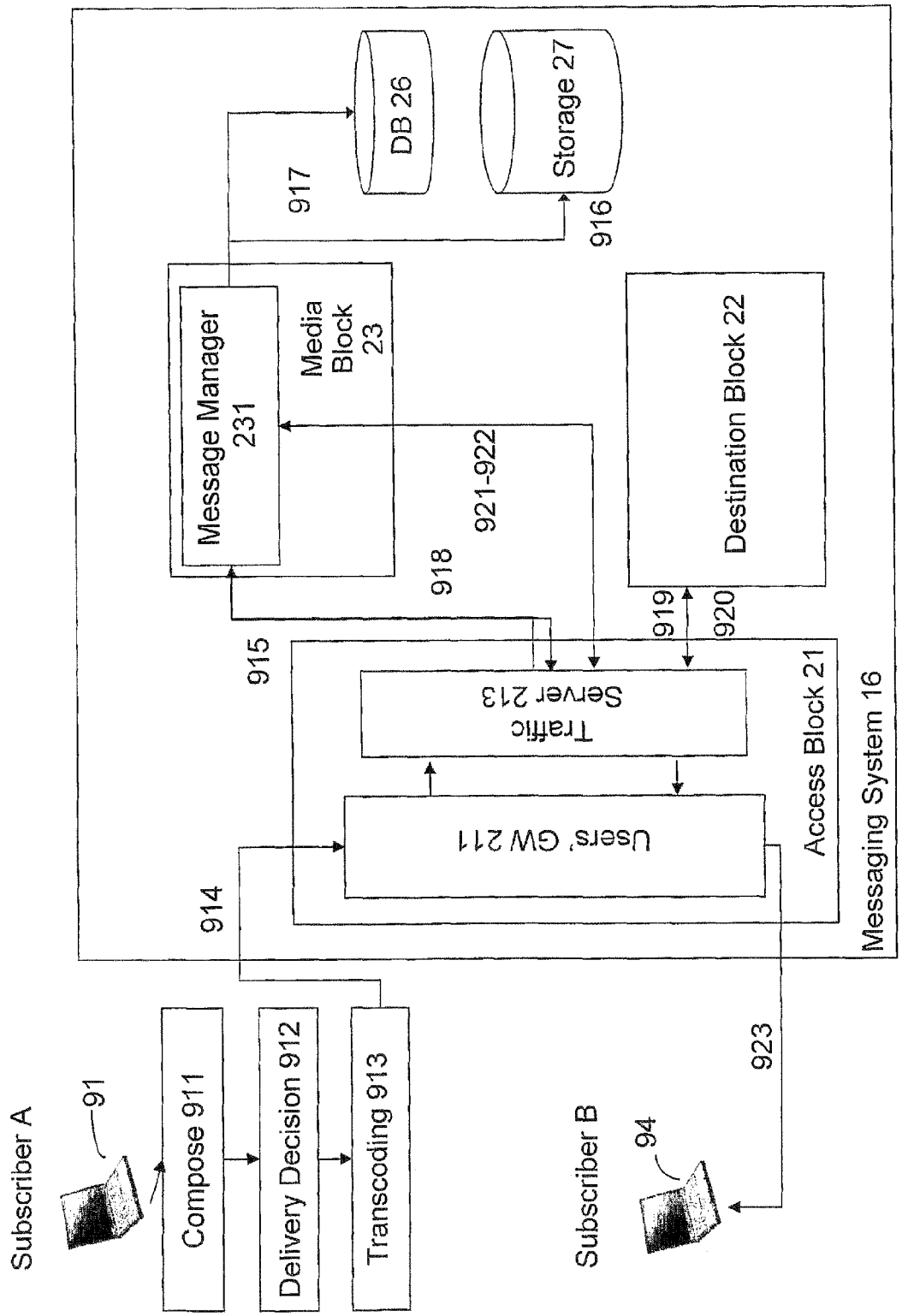
FIG. 9 illustrates a generalized flow diagram of messaging between two communication devices in accordance with certain embodiments of the present invention.

Referring to FIG. 9, there is illustrated a generalized flow diagram of messaging between two subscribers wherein the originating device 91 is a PC supporting synchronized multimedia message and the destination device 94 is a PC supporting plain messages only. The subscriber A composes 911 a synchronized multimedia message at originating device 91 to be sent to subscriber B. The client in the originating device comprises some functionality delegated by the messaging system. By way of non-limiting example, the originating device is configured to be able to determine the destination device (e.g. in accordance with subscribers' preferences and/or subscriber B availability). In certain embodiments of the invention the client at the originating device may be configured to obtain availability information from the messaging system and/or other platform(s). The client may be also configured to request the messaging system for information with regard to Subscriber B preferences and/or results of preferred destination device calculations, and the messaging system may be configured to provide such information to the client. After the client obtains information with regard to the destination device, it takes 912 delivery decision and provides the appropriate transcoding 913 matching (fully or partly) the message to capabilities of destination device 94 and communication media. The converted message is uploaded 914 to the messaging system 16 and received via user's gateway 211. The gateway parses the message and sends it to the traffic server, the traffic server passes 915 the message to the message manager. The message manager sends 916 the message media items to be stored in the storage 27 and sends 917 the related metadata to be stored in the DB 26. The media block also sends 918 an origination/destination request to the traffic server which passes 919 the request to the destination block 22. The destination block returns 920 the answer to the message manager. The traffic manager passes 921 the answer to the message manager and the message manager obtains the delivery instructions. In the current example the delivery instructions are the following: deliver the message without changing the message format/layout, and notify the destination device. (In certain cases if the client provides only partial matching of message, the system may complement the converting process.) Accordingly, the message manager passes 922 the message to the traffic server and the traffic server passes 721 the message to the users' gateway. The gateway sends 922 the message notification to Subscriber B.

In accordance with further aspects of the present invention, the messaging system may facilitate composing messages using pre-defined templates. In accordance with certain embodiments of the present invention the messaging system supports different types of templates, including, but not limiting, the illustrated in Table 1. Each type of template and/or each template is provided with unique identifier capable to be recognized by the messaging system and/or client and stored in the message metadata.

TABLE 1

| Template's type | Content Structure | Direction |
|---|---|---|
| General | Pre-defined text with capability of composing multimedia message comprising one or more media items (e.g., images, audio clips, video clips). Optionally part of media items and/or placeholders thereof may be pre-defined. | 1-way |
| Greeting-like | Pre-defined graphics with capability of inserting text and/or media items. | 1-way |
| Interactive message (initial message and reply) | Pre-defined text with capability to insert one or more media items to be selected by receiver for sending in reply. Part of media items and/or placeholders thereof and/or buttons and/or checkboxes may be pre-defined. | 2-way |
| Email | Pre-defined text with capability of editing and attaching media items | 1-way |
| Text | Pre-defined text with capability of editing | 1-way |

The templates may be stored in the communication device and/or the messaging system, and may be personalized in accordance with subscriber's preferences and/or the communication device. Some of the templates may include one or more predefined rules and/or wizards guiding the subscriber through composing template-based messages, prompting input and dynamically updating the output. For example, an interactive template (e.g. conversation template, voting template, decision template, etc.) may facilitate the message-composing subscriber to select two or more media items to be suggested to the receiving subscriber as options for selection, ranking, voting or other similar action and add a text and/or media file for instruction. The message receiving subscriber does not need to compose a message for reply, he/she may just provide the expected action (e.g. select certain media item) and, optionally, add text and/or media item. For example, the message-originating subscriber may place images of different products and add audio file with a question what to buy. The receiving subscriber upon receiving such message may select appropriate "Yes"/"No" button/checkbox (or, for example, delete non-relevant images) and reply.

The invention, in some of its aspects, is aimed to provide a novel solution facilitating ubiquitous templates supporting different types of originating and destination devices and seamlessly matching the template-based messages to capabilities of the originating and/or destination devices and subscriber's preferences.

Figure 10:
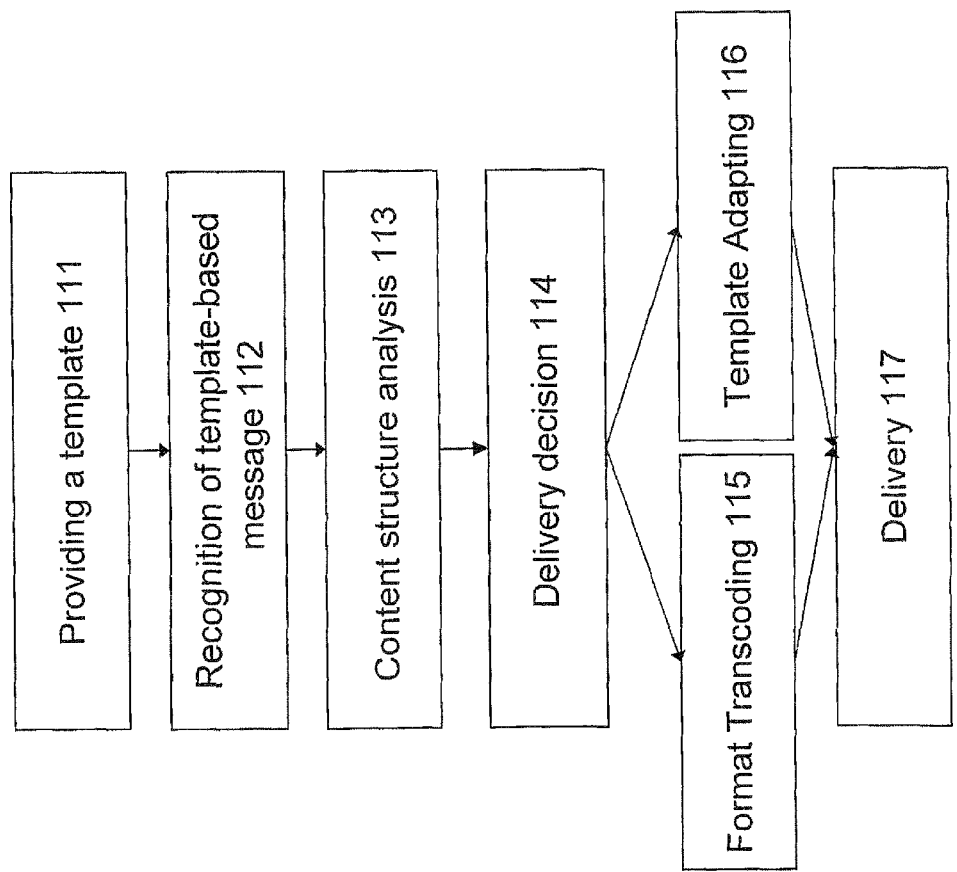
FIG. 10 illustrates a generalized flow diagram of template-based messaging in accordance with certain embodiments of the present invention.

Bearing this in mind, attention is drawn to FIG. 10, illustrating a flowchart of template-based message communication in the messaging system described with reference to FIGS. 1-9.

In accordance with certain embodiments of the present invention the system and/or client are configured to provide 111 the subscriber with a template. The template may be personalized in accordance with subscriber's preferences. The template may comprise (and/or or enable to use) emotions, visual messages and other non contextual data. The messaging system is configured to recognize 112 template-based messages and the template unique identifier comprised in the message metadata, and to analyze 113 the content structure of the template. The messaging system obtains 114 a delivery decision in a manner similar to detailed with reference to FIGS. 6-9 wherein delivery instructions include instructions related to template adaptation to displaying capabilities of destination device. In accordance with delivery instructions, the system provides format transcoding 115 and template adapting 116 and facilitates the message delivery 117. The template adapting includes converting the template type and/or template layout. The layout of certain template depends on capabilities of destination device as, by way of non-limiting example, is illustrated in Table 2. In accordance with certain embodiments of the present invention a template serves as an "envelope" for the message during the communication. The system may match only envelope (template) or the envelope (template) and the message itself. Accordingly, for template-based messaging the delivery instructions with regard to layout of the message are based on predefined layout of message matching to template unique identifier and capabilities of destination device. The layout may be further predefined in accordance with information to be obtained with regard to certain filled field, format of selected media items, etc. Among advantages of certain aspects of the present invention is reduction in need of content analysis and ability to provide layout-related delivery instructions based on pre-defined rules and parameters (e.g. in a form of a look-up table).

In certain embodiments of the invention the type of template in combination with subscriber (or system) preferences may have impact on decision on destination device and/or format transcoding. For example, the "interactive reply" messages may be required to be always delivered to the device originated the "interactive initial" message and/or via protocol matching to said message type.

TABLE 2

| Templates' type | Layout for PC | Layout for Web | Layout for cell-phone |
|---|---|---|---|
| General | Basic frame graphics Sender's avatar Text List of clickable media thumbnails Media display area Controls for playing all media continuously Save media controls Reply controls Forward controls | Basic frame graphics Sender's avatar Text List of clickable media thumbnails Media display area, reduced for web Controls for playing all media continuously Save media controls Reply controls Forward controls | Basic frame graphics Sender's name Text For images: list of clickable media, reduced for device For audio/video: list of clickable icons into reduced media Reply controls Forward controls |
| Greeting-like | Basic frame graphics Sender's avatar Predefined animated graphics with text Reply controls Forward controls | Basic frame graphics Sender's avatar Predefined animated graphics with text on Reply controls Forward controls | Basic frame graphics Sender's name Text Predefined reduced animated image Reply controls Forward controls |
| Interactive initial | Basic frame graphics Sender's avatar Text List of images Controls to select one or more of the images Reply controls | Basic frame graphics Sender's avatar Text List of images, reduced for web Controls to select one or more of the images Reply controls | Basic frame graphics Sender's name Text List of images, reduced for device Controls to select one of the images Reply controls |
| Interactive reply | Basic frame graphics Sender's avatar Text List of images Indication for selected images Reply controls | Basic frame graphics Sender's avatar Text List of images, reduced for web Indication for selected images Reply controls | Basic frame graphics Sender's name Text Selected image, reduced for device Reply controls |
| Email | Basic frame graphics Sender's details Text, truncated Links to attachments Reply controls Forward controls | Basic frame graphics Sender's details Text, truncated Links to attachments Reply controls Forward controls | Basic frame graphics Sender's details Text, truncated Reply controls Forward controls |
| Text | Basic frame graphics Sender's avatar Text Reply controls Forward controls | Basic frame graphics Sender's avatar Text Reply controls Forward controls | Basic frame graphics Sender's name Text Reply controls Forward controls |

If the template-based message is designated to a non-subscriber, the templates module 51 extracts the initial template (per template ID) from the storage 27, restores information of initial message layout and provides it for further matching.

Figure 11:
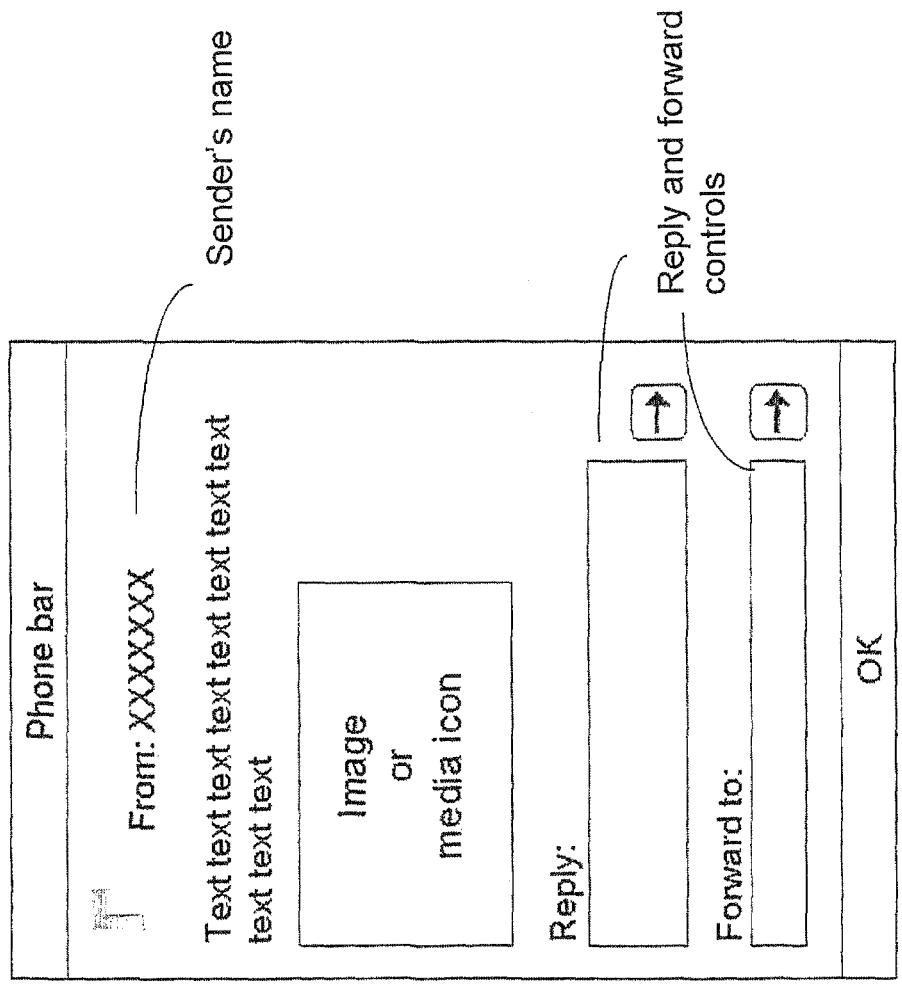
FIG. 11 illustrates an exemplary layout of a message displayed on cellphone screen in accordance with certain embodiments of the present invention.
Figure 12:
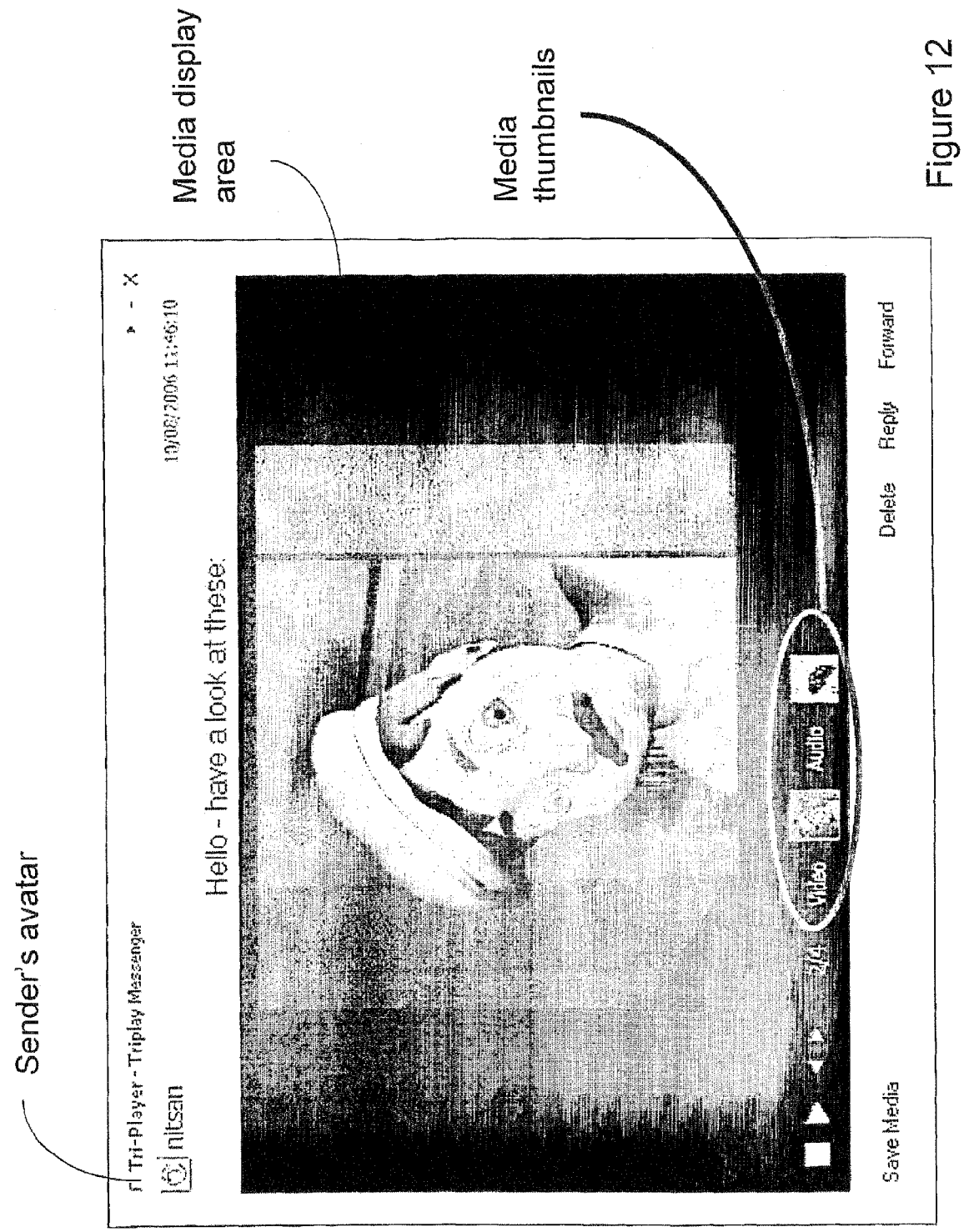
FIG. 12 illustrates an exemplary layout of a message displayed on a PC screen in accordance with certain embodiments of the present invention.

Referring to FIGS. 11 and 12, there are illustrated exemplary layouts of messages displayed on cell phone and PC screens.

In accordance with further aspects of the present invention, the client to be downloaded to communication device shall support one or more of the following features:
  composing a template-based message (e.g. using drag-and-drop controls);
  visual editing of media items (e.g., cropping images and songs) as part of composing;
  managing contacts and groups, including contact icons;
  enabling sending a message by drag-and-drop on contact icons;
  managing contact privileges and blocking;
  managing message assigned labels;
  synchronizing messages between client and messaging system;
  setting user preferences;
  automatically providing indication of user's availability;
  enabling a user to provide manual indications of availability;
  enabling message sharing between devices assigned for one subscriber and/or within a group of subscribers.

It should be noted that the invention is not bound by the specific one-to-one scenarios described with reference to FIGS. 6-10. Those versed in the art will readily appreciate that the invention is, likewise, applicable to one-to-many and many-to-many message communication, including communication in a group.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the concept upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method, comprising:
   registering, by a messaging system, a first user of the messaging system, the first user accessing the messaging system using a first client remotely delivered to a first cellular phone of the first user, the first client being matched to a first set of capabilities characterizing the first cellular phone;
   registering, by the messaging system, a second user of the messaging system, the second user accessing the messaging system using a second client remotely delivered to a second cellular phone of the second user, the second client being matched to a second set of capabilities characterizing the second cellular phone, wherein:
      the second user of the messaging system is different than the first user of the messaging system, and
      the second client remotely delivered to the second cellular phone is different than the first client remotely delivered to the first cellular phone;
   receiving, by the messaging system and from the first client remotely delivered to the first cellular phone of the first user, an initial message characterized, at least, by message format, an initial message layout, and data indicative of the first user and the second user who are associated with the initial message;
   before delivery to the second client remotely delivered to the second cellular phone of the second user, enabling, by the messaging system, conversion, in accordance with a criterion related to displaying capabilities of the second cellular phone, of the initial message into an adapted message,
      wherein the adapted message is characterized by an adapted message layout,
      wherein the adapted message layout differs from the initial message layout in at least one characteristic, the at least one characteristic being at least one of:
         i) a number of media objects,
         ii) at least one graphical image of at least one media object,
         iii) a size of at least one placeholder related to at least one media object, and
         iv) a location of at least one media object within respective message layout; and facilitating, by the messaging system, delivery of the adapted message to the second client remotely delivered to the second cellular phone of the second user.

2. The method of claim 1, wherein the adapted message is further characterized by adapted message format, the method further comprising providing the adapted format by trans-coding the initial message.

3. The method of claim 1, wherein the initial message is characterized by the initial message layout based on a template, and wherein the adapted message layout is provided in accordance with information related to the template.

4. The method of claim 1, wherein enabling, by the messaging system, conversion of the initial message into the adapted message comprises converting, by the messaging system, the initial message into the adapted message.

5. The method of claim 1, wherein the at least one characteristic is a number of media objects.

6. The method of claim 1, wherein the at least one characteristic is at least one graphical image of at least one media object.

7. The method of claim 1, wherein the at least one characteristic is a size of at least one placeholder related to at least one media object.

8. The method of claim 1, wherein the at least one characteristic is a location of at least one media object within respective message layout.

9. The method of claim 1:
   wherein the initial message includes a video; and
   wherein enabling conversion, in accordance with a criterion related to displaying capabilities of the second cellular phone, of the initial message into an adapted message comprises:
      parsing, by the messaging system, the video from the initial message;
      based on parsing the video from the initial message, storing, in one or more electronic storage devices accessible by the messaging system, the video and metadata related to the video;
      replacing, in the initial message by the messaging system, the video with a clickable icon into a version of the video reduced for the second cellular phone.

10. The method of claim 1, further comprising:
   based on registration of the first user of the messaging system, assigning, by the messaging system, a first cellular telephone number of the first cellular phone as a unique identification number associated with the first user on the messaging system; and
   based on registration of the second user of the messaging system, assigning, by the messaging system, a second cellular telephone number of the second cellular phone as a unique identification number associated with the second user on the messaging system, the second cellular telephone number being different than the first cellular telephone number,
   wherein receiving the initial message characterized, at least, by message format, the initial message layout, and data indicative of the first user and the second user who are associated with the initial message comprises receiving the initial message characterized, at least, by message format, the initial message layout, and the first cellular telephone number and the second cellular telephone number.

11. A messaging system comprising: an access block operatively coupled to a media block, wherein:
   the access block is configured to:
      register a first user of the messaging system, the first user accessing the messaging system using a first client remotely delivered to a first cellular phone of the first user, the first client being matched to a first set of capabilities characterizing the first cellular phone;

register a second user of the messaging system, the second user accessing the messaging system using a second client remotely delivered to a second cellular phone of the second user, the second client being matched to a second set of capabilities characterizing the second cellular phone, wherein:

the second user of the messaging system is different than the first user of the messaging system, and the second client remotely delivered to the second cellular phone is different than the first client remotely delivered to the first cellular phone;

receive from the first client remotely delivered to the first cellular phone of the first user, an initial message characterized, at least, by message format, an initial message layout, and data indicative of the first user and the second user who are associated with the initial message;

the media block is configured to:

before delivery to the second client remotely delivered to the second cellular phone of the second user, to enable conversion, in accordance with a criterion related to displaying capabilities of the second cellular phone, of the initial message into an adapted message, wherein the adapted message is characterized by an adapted message layout, wherein the adapted message layout differs from the initial message layout in at least one characteristic, the at least one characteristic being at least one of:
i) a number of media objects,
ii) at least one graphical image of at least one media object,
iii) a size of at least one placeholder related to at least one media object, and
iv) a location of at least one media object within respective message layout; and the access block is further configured to facilitate delivery of the adapted message to the second client remotely delivered to the second cellular phone of the second user.

12. The system of claim 11, wherein the adapted message is further characterized by adapted message format, the media block further configured to provide the adapted format by trans-coding the initial message.

13. The system of claim 11, wherein the initial message is characterized by the initial message layout based on a template, and wherein the adapted message layout is provided in accordance with information related to the template.

14. The system of claim 11, wherein the media block is configured to convert the initial message into the adapted message thereby enabling conversion of the initial message into the adapted message.

15. The system of claim 11, wherein the at least one characteristic is a number of media objects.

16. The system of claim 11, wherein the at least one characteristic is at least one graphical image of at least one media object.

17. The system of claim 11, wherein the at least one characteristic is a size of at least one placeholder related to at least one media object.

18. The system of claim 11, wherein the at least one characteristic is a location of at least one media object within respective message layout.

19. The system of claim 11:

wherein the initial message includes a video; and wherein enabling conversion by the media block, in accordance with a criterion related to displaying capabilities of the second cellular phone, of the initial message into an adapted message comprises:

based on parsing the video from the initial message, enabling storing, in one or more electronic storage devices accessible by the messaging system, the video and metadata related to the video;

enabling replacing in the initial message the video with a clickable icon into a version of the video reduced for the second cellular phone.

20. The system of claim 11, wherein the access block is further configured:

based on registration of the first user of the messaging system, assign a first cellular telephone number of the first cellular phone as a unique identification number associated with the first user on the messaging system; and based on registration of the second user of the messaging system, a second cellular telephone number of the second cellular phone as a unique identification number associated with the second user on the messaging system, the second cellular telephone number being different than the first cellular telephone number, wherein receiving the initial message characterized, at least, by message format, the initial message layout, and data indicative of the first user and the second user who are associated with the initial message comprises receiving the initial message characterized, at least, by message format, the initial message layout, and the first cellular telephone number and the second cellular telephone number.

* * * * *